(12) United States Patent
Peterson et al.

(10) Patent No.: US 12,210,108 B2
(45) Date of Patent: Jan. 28, 2025

(54) RECEPTION OF SIGNALS FOR RANGING, TIMING, AND DATA TRANSFER

(71) Applicant: Microchip Technology Incorporated, Chandler, AZ (US)

(72) Inventors: Benjamin Peterson, Waterford, CT (US); Jeremy Dean Warriner, Longmont, CO (US); Richard Stuart Foster, Louisville, CO (US)

(73) Assignee: Microchip Technology, Inc., Chandler, AZ (US)

( * ) Notice: Subject to any disclaimer, the term of this patent is extended or adjusted under 35 U.S.C. 154(b) by 274 days.

(21) Appl. No.: 17/660,020

(22) Filed: Apr. 20, 2022

(65) Prior Publication Data

US 2022/0244341 A1 Aug. 4, 2022

Related U.S. Application Data

(63) Continuation-in-part of application No. 17/447,392, filed on Sep. 10, 2021.

(60) Provisional application No. 63/262,728, filed on Oct. 19, 2021, provisional application No. 63/262,729, filed on Oct. 19, 2021, provisional application No. 63/198,476, filed on Oct. 21, 2020.

(51) Int. Cl.
*G01S 5/00* (2006.01)

(52) U.S. Cl.
CPC .................. *G01S 5/0045* (2013.01)

(58) Field of Classification Search
CPC ....... G01S 1/24–28; G01S 1/042–0428; G01S 5/0045; G01S 5/10; G01S 5/14
See application file for complete search history.

(56) References Cited

U.S. PATENT DOCUMENTS

| 3,870,999 | A |   | 3/1975 | Mathews et al. |
| 4,275,398 | A |   | 6/1981 | Parker |
| 4,594,594 | A | * | 6/1986 | Fukuhara ............... G01S 1/245 342/389 |

(Continued)

FOREIGN PATENT DOCUMENTS

| EP | 0315377 A2 | 5/1989 |
| WO | 2018/044834 A1 | 3/2018 |
| WO | 2022/087553 A1 | 4/2022 |

OTHER PUBLICATIONS

Lo et al., "Assessing the Loran Cycle Confidence Algorithm," Proceedings of the International Loran Association 35th Annual Meeting, Groton, CT, (Oct. 2006), 19 pages.

(Continued)

*Primary Examiner* — Cassi J Galt
(74) *Attorney, Agent, or Firm* — TraskBritt

(57) ABSTRACT

A device is disclosed. In one or more examples, the device may include an antenna to receive a signal encoding timing information for one or more of positioning, navigation, and timing. The signal may include a pulse group comprising a number of ranging pulses and a number of data pulses subsequent to the number of ranging pulses. Respective ones of the number of data pulses may have a phase of either a positive-going phase or a negative-going phase. Data may be encoded using the either positive-going phases or negative-going phases of the data pulses. The device may include a processor to decode the data at least partially responsive to the phases of the respective ones of the number of data pulses.

19 Claims, 24 Drawing Sheets

| 6 Bit Words | | | | | | |
|---|---|---|---|---|---|---|
| | 1 | 2 | 3 | 4 | 5 | 6 |
| 1 | T01 | D01 | D02 | D03 | D04 | T02 |
| 2 | D05 | D06 | D07 | D08 | T03 | D09 |
| 3 | D10 | D11 | D12 | T04 | D13 | D14 |
| 4 | D15 | D16 | T05 | D17 | D18 | D19 |
| 5 | D20 | T06 | D21 | D22 | D23 | D24 |
| 6 | T07 | D25 | D26 | D27 | D28 | T08 |
| 7 | D29 | D30 | D31 | D32 | T09 | D33 |
| 8 | D34 | D35 | D36 | T10 | D37 | D38 |
| 9 | D39 | D40 | T11 | D41 | D42 | D43 |
| 10 | D44 | T12 | D45 | D46 | D47 | D48 |

Txx = 12 Time-Message Pulse Sets
Dxx = 48 Data-Message Pulse Sets

(56) References Cited

U.S. PATENT DOCUMENTS

| | | |
|---|---|---|
| 10,778,362 B2 | 9/2020 | Mason |
| 2018/0356529 A1 | 12/2018 | Lee et al. |
| 2019/0377055 A1* | 12/2019 | Offermans ............ H04W 12/04 |
| 2020/0326419 A1 | 10/2020 | Parsche et al. |

OTHER PUBLICATIONS

Lo et al., "Broadcasting Data from an SBAS Reference Network over Low Rate Broadcast Channels", (2000), pp. 199-209.

Lo et al., "Defining Primary, Secondary, Additional Secondary Factors for RTCM Minimum Performance Specifications (MPS)," (2009), 9 pages.

Lo et al., "Enhanced Loran," (No Date), 70 pages.

Lo et al., "Loran Coverage Availability Simulation Tool," (2008), 11 pages.

Lo et al., "Loran Data Modulation: A Primer," IEEE Aerospace and Electronic Systems Magazine, vol. 22, Issue 9, (Sep. 2007), pp. 31-51.

Lo et al., "Loran Data Modulation: Extensions and Examples," IEEE Transactions on Aerospace and Electronic Systems, vol. 43, Issue 2, (Apr. 2007), pp. 628-644.

Lo et al., "Proving the Integrity of the Weighted Sum Squared Error (WSSE) Loran Cycle Confidence Algorithm," Annual of Navigation, vol. 54 (2007), pp. 277-291.

Lo et al., "Using Loran for Broadcast of Integrity Information for Modernized Global Navigation Satellite Systems (GNSS)," (2008), 10 pages.

Petersen et al., "Enhanced Loran-C Data Channel Project", International Symposium on Integration of Loran-C/Eurofix Andegnos/Galileo, XP002224777, (Mar. 22, 2000) pp. 1-13, p. 7, left-hand-column, first paragraph.

Peterson et al., "Differential Loran-C," (2004), 21 pages.

Peterson et al., "High Speed Loran-C Data Communications—Flight Test Results", Proceedings of the ION-GPS 2001, Salt Lake City, Sep. 2001, pp. 1919-1932.

Peterson et al., "High Speed Loran-C Data Communications", Proceedings of the 2nd International Symposium on Integration of Loran-C/Eurofix and Egnos/Galileo, Bonn, Germany, Feb. 2001, pp. 135-157.

Peterson et al., "Improving Loran Coverage with Low Power Transmitters," Journal of Navigation, vol. 63, (2010), pp. 23-38.

Peterson et al., "Integrating Loran and GNSS for Safety of Life Applications," Proceedings of the 21st International Technical Meeting of the Satellite Division of the Institute of Navigation, (2008), pp. 1619-1630.

Peterson et al., "WAAS messages via Loran Data Communications—Technical progress towards going operational", Proceedings of Institute of Navigation National Technical Meeting, San Diego, CA, Jan. 2002, pp. 138-145.

International Search Report for International Application No. PCT/US2022/071827, mailed Jul. 25, 2022, 6 pages.

International Search Report for International Application No. PCT/US2022/071828, mailed Jul. 29, 2022, 5 pages.

International Search Report for International Application No. PCT/US2022/071829, mailed Aug. 3, 2022, 6 pages.

International Written Opinion for International Application No. PCT/US2022/071827, mailed Jul. 25, 2022, 9 pages.

International Written Opinion for International Application No. PCT/US2022/071828, mailed Jul. 29, 2022, 7 pages.

International Written Opinion for International Application No. PCT/US2022/071829, mailed Aug. 3, 2022, 8 pages.

\* cited by examiner

| | 6 Bit Words | | | | | |
|---|---|---|---|---|---|---|
| | 1 | 2 | 3 | 4 | 5 | 6 |
| 1 | T01 | D01 | D02 | D03 | D04 | T02 |
| 2 | D05 | D06 | D07 | D08 | T03 | D09 |
| 3 | D10 | D11 | D12 | T04 | D13 | D14 |
| 4 | D15 | D16 | T05 | D17 | D18 | D19 |
| 5 | D20 | T06 | D21 | D22 | D23 | D24 |
| 6 | T07 | D25 | D26 | D27 | D28 | T08 |
| 7 | D29 | D30 | D31 | D32 | T09 | D33 |
| 8 | D34 | D35 | D36 | T10 | D37 | D38 |
| 9 | D39 | D40 | T11 | D41 | D42 | D43 |
| 10 | D44 | T12 | D45 | D46 | D47 | D48 |

Txx = 12 Time-Message Pulse Sets
Dxx = 48 Data-Message Pulse Sets

Pulse Groups

*FIG. 2*

RECEPTION OF SIGNALS FOR RANGING, TIMING, AND DATA TRANSFER

CROSS-REFERENCE TO RELATED APPLICATIONS

This application claims priority to U.S. Provisional Patent Application Ser. No. 63/262,729, filed Oct. 19, 2021. This application also claims priority to U.S. Provisional Patent Application Ser. No. 63/262,728, filed Oct. 19, 2021. This application is also a continuation-in-part to U.S. patent application Ser. No. 17/447,392, filed Sep. 10, 2021, which claims priority to U.S. Provisional Patent Application Ser. No. 63/198,476, filed Oct. 21, 2020. This application is being filed on the same day as a first-U.S. patent application Ser. No. 17/660,016, filed Apr. 20, 2022, U.S. patent application Ser. No. 17/660,019, filed Apr. 20, 2022, U.S. patent application Ser. No. 17/660,017, filed Apr. 20, 2022, for and U.S. patent application Ser. No. 17/660,015, filed Apr. 20, 2022. The disclosure of each of which is hereby incorporated herein in its entirety by this reference.

BACKGROUND

Transmitters of radio waves (e.g., ground based radio waves) are sometimes used to broadcast signals for positioning, navigation, or timing. An example system for transmitting such signals is Long-Range Navigation (LORAN) and variations thereon.

BRIEF DESCRIPTION OF THE DRAWINGS

The purpose and advantages of the examples of the present disclosure will be apparent to one of skill in the art from the detailed description in conjunction with the following appended drawings.

FIG. 2 illustrates an encoded-message ordering scheme according to one or more examples.

DETAILED DESCRIPTION

Figure 1A:
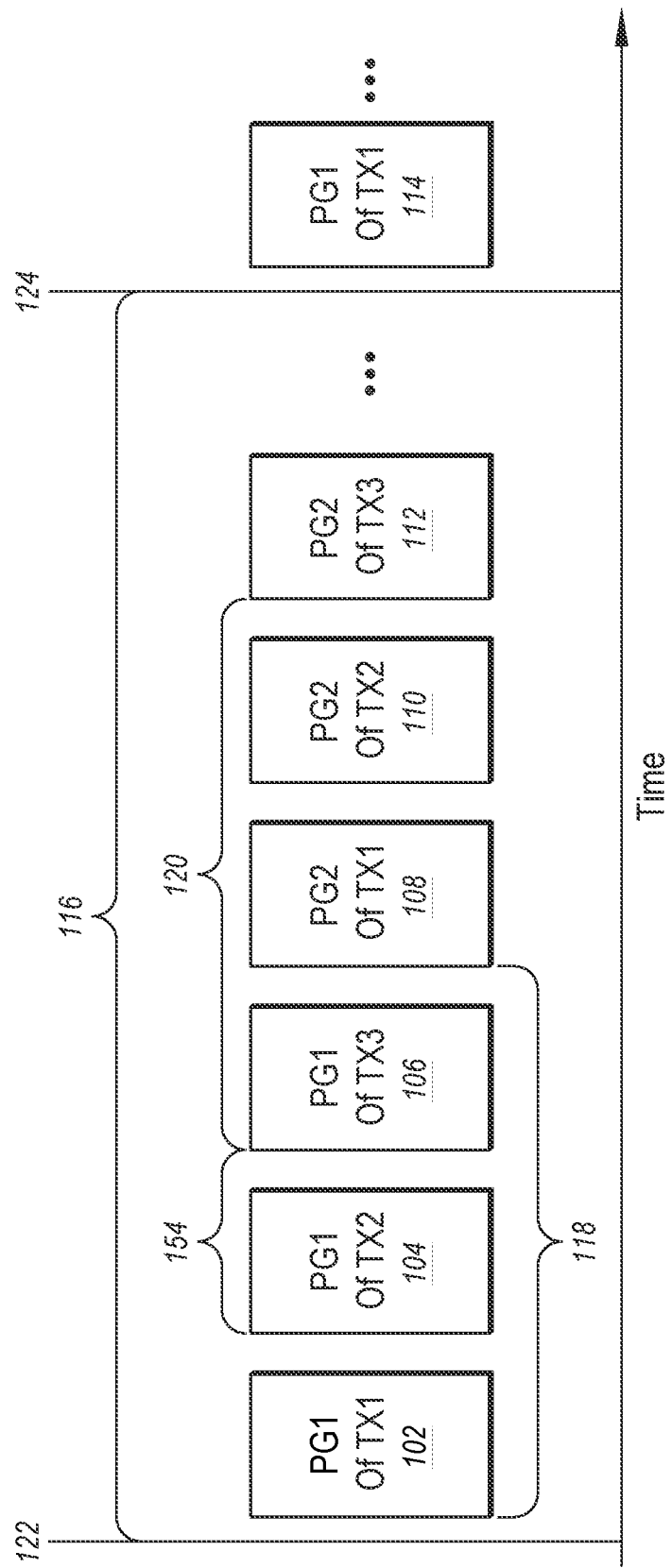
FIG. 1A illustrates example pulse groups of an example epoch according to one or more examples.

In the following detailed description, reference is made to the accompanying drawings, which form a part hereof, and in which are shown, by way of illustration, specific examples of examples in which the present disclosure may be practiced. These examples are described in sufficient detail to enable a person of ordinary skill in the art to practice the present disclosure. However, other examples enabled herein may be utilized, and structural, material, and process changes may be made without departing from the scope of the disclosure.

The illustrations presented herein are not meant to be actual views of any particular method, system, device, or structure, but are merely idealized representations that are employed to describe the examples. In some instances, similar structures or components in the various drawings may retain the same or similar numbering for the convenience of the reader; however, the similarity in numbering does not necessarily mean that the structures or components are identical in size, composition, configuration, or any other property.

The following description may include examples to help enable one of ordinary skill in the art to practice the disclosed examples. The use of the terms "exemplary," "by example," and "for example," means that the related description is explanatory, and though the scope of the disclosure is intended to encompass the examples and legal equivalents, the use of such terms is not intended to limit the scope of an example of this disclosure to the specified components, steps, features, functions, or the like.

It will be readily understood that the components of the examples as generally described herein and illustrated in the drawings could be arranged and designed in a wide variety of different configurations. Thus, the following description of various examples is not intended to limit the scope of the present disclosure, but is merely representative of various examples. While the various aspects of the examples may be presented in the drawings, the drawings are not necessarily drawn to scale unless specifically indicated.

Furthermore, specific implementations shown and described are only examples and should not be construed as the only way to implement the present disclosure unless specified otherwise herein. Elements, circuits, and functions may be shown in block diagram form in order not to obscure the present disclosure in unnecessary detail. Additionally, block definitions and partitioning of logic between various blocks is exemplary of a specific implementation. It will be readily apparent to one of ordinary skill in the art that the present disclosure may be practiced by numerous other partitioning solutions. For the most part, details concerning timing considerations and the like have been omitted where such details are not necessary to obtain a complete understanding of the present disclosure and are within the abilities of persons of ordinary skill in the relevant art.

Those of ordinary skill in the art will understand that information and signals may be represented using any of a variety of different technologies and techniques. Some drawings may illustrate signals as a single signal for clarity of presentation and description. It will be understood by a person of ordinary skill in the art that the signal may represent a collection of signals, wherein the collection may have a variety of bit widths and the present disclosure may be implemented on any number of data signals including a single data signal.

The various illustrative logical blocks, modules, and circuits described in connection with the examples disclosed herein may be implemented or performed with a general purpose processor, a special purpose processor, a digital signal processor (DSP), an Integrated Circuit (IC), an Application Specific Integrated Circuit (ASIC), a Field Programmable Gate Array (FPGA) or other programmable logic device, discrete gate or transistor logic, discrete hardware components, or any combination thereof designed to perform the functions described herein. A general-purpose processor (may also be referred to herein as a host processor or simply a host) may be a microprocessor, but in the alternative, the processor may be any conventional processor, controller, microcontroller, or state machine. A processor may also be implemented as a combination of computing devices, such as a combination of a DSP and a microprocessor, a plurality of microprocessors, one or more microprocessors in conjunction with a DSP core, or any other such configuration. A general-purpose computer including a processor is considered a special-purpose computer while the general-purpose computer is configured to execute computing instructions (e.g., software code, without limitation) related to examples.

The examples may be described in terms of a process that is depicted as a flowchart, a flow diagram, a structure diagram, or a block diagram. Although a flowchart may describe operational acts as a sequential process, many of these acts can be performed in another sequence, in parallel, or substantially concurrently. In addition, the order of the acts may be re-arranged. A process may correspond to a method, a thread, a function, a procedure, a subroutine, a subprogram, other structure, or combinations thereof. Furthermore, the methods disclosed herein may be implemented in hardware, software, or both. If implemented in software, the functions may be stored or transmitted as one or more instructions or code on computer-readable media. Computer-readable media includes both computer storage media and communication media including any medium that facilitates transfer of a computer program from one place to another.

Any reference to an element herein using a designation such as "first," "second," and so forth does not limit the quantity or order of those elements, unless such limitation is explicitly stated. Rather, these designations may be used herein as a convenient method of distinguishing between two or more elements or instances of an element. Thus, a reference to first and second elements does not mean that only two elements may be employed there or that the first element must precede the second element in some manner. In addition, unless stated otherwise, a set of elements may include one or more elements.

As used herein, the term "substantially" in reference to a given parameter, property, or condition means and includes to a degree that one of ordinary skill in the art would understand that the given parameter, property, or condition is met with a small degree of variance, such as, for example, within acceptable manufacturing tolerances. By way of example, depending on the particular parameter, property, or condition that is substantially met, the parameter, property, or condition may be at least 90% met, at least 95% met, or even at least 99% met.

Long Range Navigation (LORAN or just "Loran") signals, developed in the 1950's, are ranging signals of broadcast radio frequency (RF) groundwaves at low frequencies, typically between 90 and 110 kilohertz (kHz), that can be used for positioning, navigation, and/or timing ("PNT"). Such ranging signals can travel more than 1000 miles, through air, structures, earth, and water and can be up to 10,000 times more powerful than, as a non-limiting example, Global Positioning System (GPS) signals. Loran technology (and more specifically, an intermediate technology called "Loran-C") was upgraded in the 1990's resulting in enhanced Loran ("eLoran") navigation systems. Among other things, eLoran navigation systems, included transmitter sites synchronized to Coordinated Universal Time (UTC), use of Time of Transmission (TOT) control rather than System Area Monitor (SAM) control used by Loran navigation systems, addition of a Loran Data Channel (LDC) to a ranging signal to provide time, improved positioning accuracy, and increased integrity.

A typical broadcast of an eLoran-type ranging signal is a pulse train of eLoran-type pulses of oscillating signals (e.g., pulses of oscillating signals, the pulses having an envelope associated with eLoran). A pulse envelope of each pulse includes a leading edge that begins at a first point of rest (i.e., zero or negligible energy of the oscillating signal) and rises until it reaches a point of maximum amplitude (the "peak" of the pulse), and a tail edge that begins at the peak and falls until it reaches a second point of rest. In a standard eLoran pulse, a portion of the pulse defined substantially during part of the leading edge is used for phase tracking (in standard eLoran, typically the sixth zero crossing by the oscillating signal) to encode timing information into a pulse and more specifically for PNT. A receiver may use a positioning technique (including, as non-limiting examples, multilateration position estimation, or hyperbolic position estimation calculations) to recover PNT information based on received eLoran-type ranging signals. Additionally, in some cases eLoran signals may be used to encode data.

Transmitters in a standard eLoran configuration known to the inventors of this disclosure may be located hundreds and sometimes over a thousand miles apart. Each transmitter may stand hundreds of feet tall (e.g., 625 feet above local ground level).

Notwithstanding the opportunities in eLoran, funding for implementation of an eLoran navigation system was reduced in the United States of America in favor of GPS systems in the 2010's and, only several transmitter towers remain standing today.

The inventors of this disclosure appreciate, generally, an over-dependence on GPS for PNT. The availability of inexpensive GPS jammers and signal spoofers raises vulnerability concerns, especially for critical infrastructure, key resources, and safety-of-life applications. Accordingly, there is recognition by industry and government entities of a need for a complement/back-up navigation system for GPS—if not, in some environments or for some applications, a replacement.

To provide a suitable backup or replacement for GPS, the inventors of this disclosure appreciate a need for: access control for eLoran PNT services; support for different levels of PNT service; increased data transfer rate (as compared to conventional eLoran) to provide additional, one-way (i.e., unidirectional) communication capability; and improved immunity to jamming and spoofing attacks.

One or more examples relate, generally, to encoding data in phases of one or more pulses. For example, a data message may be encoded in the phases of a number of pulses of a pulse group. For example, a transmitter may transmit a pulse group that may include a number of pulses (e.g., ranging pulses) that may be used (by a receiver) for acquiring the signal and/or for determining PNT information. The pulse group may additionally include a number of pulses that may be used by the transmitter to encode data (including, e.g., a message and/or timing information) (e.g., data pulses and/or timing pulses). A transmitter may encode the data in the data pulses in phases of the data pulses. For example, the transmitter may selectively set phases of the data pulses to encode data.

Additionally or alternatively, one or more examples relate, generally, to encoding information indicative of a specific transmitter in a pulse group of a ranging signal. More specifically, one or more examples relate to encoding information indicative of a transmitter in an inter-pulse interval of the pulse group.

Additionally or alternatively, one or more examples relate, generally, to arranging information transmissions to decrease the impact of burst errors at a receiver, and in various examples more specifically, according to an algorithm selected to improve the efficacy of forward error correction (FEC) techniques including those that use Reed-Solomon FEC blocks for error correction.

Additionally or alternatively, one or more examples relate, generally, to transmitting ranging signals according to a pulse-phase-signature schedule known to certain recipients of the signal. As a non-limiting example, transmitting ranging signals according to the pulse-phase-signature schedule may counter, at least partially, attempts to spoof a ranging signal.

Additionally or alternatively, one or more examples relate to delaying transmission of ranging signals according to a dithering schedule such that recipients of the ranging signals may be limited in their ability to use the ranging signals without the dithering schedule. For example, PNT information calculated based on delayed ranging signals may be inaccurate. And, in contrast, a receiver in possession of the dithering schedule may be able to correct for the delays.

One or more examples relate generally to decoding data encoded phases of one or more pulses. For example, a data message may be encoded in the phases of a number of pulses of a pulse group. For example, a transmitter may transmit a pulse group that may include a number of pulses (e.g., ranging pulses) that may be used (by a receiver) for acquiring the signal and/or for determining PNT information. The pulse group may additionally include a number of pulses that may be used by the transmitter to encode data (including, e.g., a message and/or timing information) (e.g., data pulses and/or timing pulses). A receiver may decode the data encoded in the data pulses in phases of the data pulses. For example, the receiver may identify phases of the data pulses and translate the phases of the data pulses into data (e.g., the message and/or timing information).

Additionally or alternatively, one or more examples may relate, generally, to decoding information from a pulse group of a ranging signal. The information may be indicative of a specific transmitter, e.g., the transmitter that transmitted the ranging signal. Thus, one or more examples may relate to identifying a transmitter responsive to information encoded in the pulse groups. More specifically, one or more examples may relate to identifying a transmitter responsive to an inter-pulse interval (e.g., a nominal inter-pulse interval) of a pulse group. Identifying the transmitter may aid in calculating PNT information. Additionally or alternatively, identifying the transmitter may be useful in validating the ranging signals.

Additionally or alternatively, one or more examples relate to identifying pulses of epochs according to a pulse-ordering scheme. The pulses may be ordered in an epoch of the ranging signal according to the pulse ordering scheme to, among other things, decrease the impact of burst errors.

Additionally or alternatively, one or more examples relate to validating a ranging signal by comparing phases of pulses of the ranging signal to a pulse-phase signature. Validating the ranging signal may, at least partially, counter against attempts to spoof ranging signals.

Additionally or alternatively, one or more examples relate to correcting delays added to ranging signals. For example, ranging signals may have been delayed according to a dithering schedule. One or more examples relate to calculating times of transmission of such ranging signals that account for the delay. For example, one or more examples may use the dithering schedule to correct for delays in ranging signals that were added to the ranging signals according to the dithering schedule.

While examples may be discussed herein in the context of eLoran PNT systems, a person having ordinary skill in the art will appreciate that this is just an example of an environment in which disclosed examples may be deployed and implemented; and use with other environments do not exceed the scope of this disclosure.

As used herein, the term "ranging signal" means a signal provided (e.g., broadcast) by a transmitter that may be useable to determine PNT information. Additionally, as used herein a "ranging signal" may be used for transmission of data including time information and/or a message. As such, a ranging signal may include ranging pulses: to be used to determine range and/or position information, data pulses to transmit data, and/or timing pulses to transmit time information.

As used herein, the term "pulse group" means two or more signal pulses generated by a same transmitter. A signal pulse of a ranging signal (also referred to herein as a "ranging pulse," a "data pulse," a "data-message pulse," a "timing pulse," a "time pulse," a "time-message pulse" a "timing-message pulse" and/or "pulse") is a non-limiting example of a signal pulse of a pulse group.

As used herein, "inter-pulse interval" means a duration of time defined between the start (i.e., starting time) of successive pulses of a pulse group.

As used herein, "group repetition interval" means a duration of time defined between the start (i.e., starting time) of successive pulse groups from the same transmitter.

As used herein, the terms "broadcast cycle" and "epoch" refer to two or more pulse groups not necessarily generated by a same transmitter. In some instances, the term "broadcast cycle" may be used as a shorthand to refer to the duration of a broadcast cycle. A number of pulse groups per broadcast cycle will typically be defined in a specification. As a non-limiting example, in an eLoran-based system, the number of pulse groups per broadcast cycle may be defined based on a number of desired bits for a message. In such a case, the number of pulse-groups per broadcast cycle is based on the number of pulse groups for a desired bits for a message.

FIG. 1A illustrates example pulse groups of an example epoch 116 of a ranging signal according to one or more examples. For example, FIG. 1A illustrates two pulse groups (PGs) of three different transmitters (TXs) in epoch 116. More specifically, FIG. 1A illustrates a first pulse group of a first transmitter, PG1 of TX1 102, a first pulse group of a second transmitter, PG1 of TX2 104, a first pulse group of a third transmitter PG1 of TX3 106, a second pulse group of the first transmitter, PG2 of TX1 108, a second pulse group of the second transmitter, PG2 of TX2 110, and a second pulse group of the third transmitter, PG2 of TX3 112. Additionally, FIG. 1A illustrates a first pulse group of a second epoch, PG1 of TX1 114. Although epoch 116 is illustrated as including two pulse groups from each of three transmitters, an epoch may include any number of pulse groups from any number of transmitters.

A duration of an epoch 116 generally corresponds to a time during which pulse groups (e.g., PG1 of TX1 102, PG1 of TX2 104, PG1 of TX3 106, PG2 of TX1 108, PG2 of TX2 110, PG2 of TX3 112, and additional pulse groups (e.g., from the first, second, and third transmitters)) may be/are transmitted. The duration of an epoch, such as epoch 116, may be related to a desired number of pulse groups per epoch, and a number of transmitters per geographical area or group of transmitters (which may be referred to in the art as a "chain"). As illustrated by FIG. 1A, epoch 116 is defined by a "beginning" at a start 122 of epoch 116 (or by a nominal start time as discussed below) and an "ending" at a start of a second epoch 124 (or by a nominal start of a next epoch as discussed below). An end of an epoch corresponds to a start of a subsequent epoch, and so on and so forth.

FIG. 1A illustrates two example group repetition intervals: TX1 group repetition interval 118 is defined between the start of a first pulse group of a first transmitter (e.g., PG1 of TX1 102) and the start of a second pulse group of the first transmitter (e.g., PG2 of TX1 108). TX3 group repetition interval 120 is defined between the start of a first pulse group of a third transmitter (e.g., PG1 of TX3 106) and the start of a second pulse group of the third transmitter (e.g., PG2 of TX3 112).

FIG. 1A illustrates one nominal emission delay 154, i.e., a duration of time between the start of a first pulse group and the start of an immediately following pulse group, which may be of a different transmitter. For example, nominal emission delay 154 is the duration of time between the start of PG1 of TX2 and the start of PG1 of TX3.

Notably, any suitable markers may be used to define a group repetition interval or a nominal emission delay without exceeding the scope of this disclosure, such as peaks, beginning of leading edges, pre-specified zero crossings, or combinations thereof, without limitation. As non-limiting examples, peaks of first or last pulses of the respective pulse groups, a beginning of a leading edge of the first or last pulses of the respective pulse groups, pre-specified zero-crossings of oscillating signals of the first or last pulses of the respective pulse groups, and combinations thereof, may be used to define the group repetition interval or the nominal emission delay. Unless otherwise stated, the marker used to define intervals in examples is the beginning of the leading edge of the pulses of interest. In some cases, an end of a tail edge may not be used as a marker because the tail may ring out.

Figure 1B:
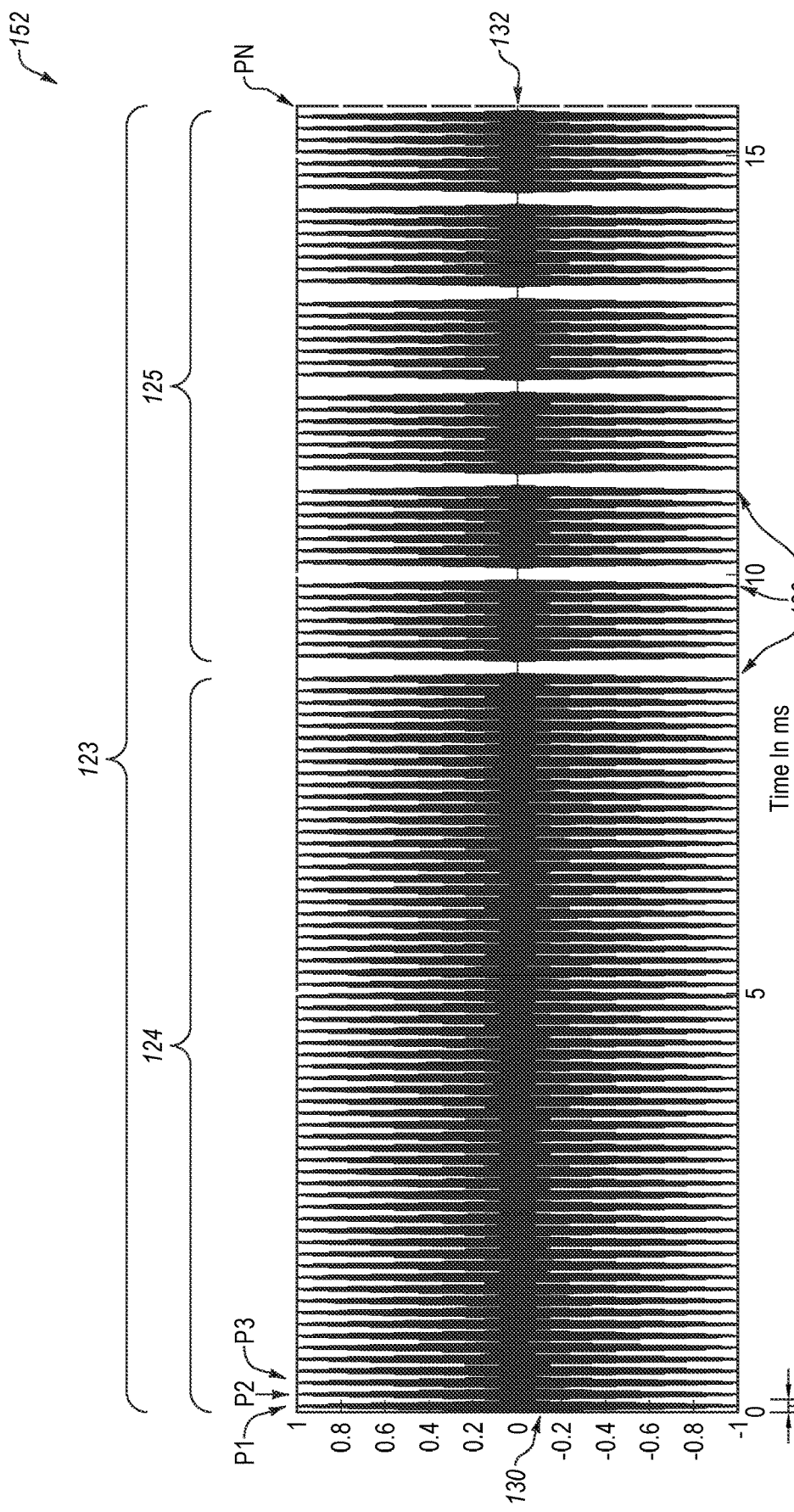
FIG. 1B illustrates example pulses within an example pulse group according to one or more examples.

FIG. 1B illustrates pulses P1 to PN of a pulse group 152 of a ranging signal, in accordance with one or more examples. In one or more examples, inter-pulse interval 128 may be an interval between successive pulses of pulse group 152. Inter-pulse interval 128 may be 140 microseconds or more. In some examples, a transmitter may use a unique (or unique within a geographical region) inter-pulse interval. Thus, in some examples, an inter-pulse interval 128 may be used to identify a transmitter that transmitted a respective pulse group. In other words, in some examples, the duration of an inter-pulse interval 128 may encode a transmitter identifier into a pulse group. Notably, any suitable markers may be used to define inter-pulse interval 128 without exceeding the scope of this disclosure, as non-limiting examples, starting times, peaks, an end of a tail edge, a beginning of a leading edge, pre-specified zero-crossings of oscillating signals, and combinations thereof.

FIG. 1B illustrates pulses that may be part of any of the pulse groups discussed herein, such as PG1 of TX1 102 illustrated in FIG. 1A, without limitation. This disclosure is not limited to the shapes of the pulse envelopes of P1 to PN illustrated by FIG. 1B. Use of other shapes of pulse envelopes, such as the shape of the pulse envelope depicted by FIG. 1C, without limitation, are specifically contemplated and do not exceed the scope of this disclosure.

Pulse group 152 includes 105 pulses, each occupying 140 microseconds or more in time. The first 63 pulses 124 of each pulse group 152 may be used to acquire the signal. The last 42 pulses 125 may be used to encode the time and data message. The last 42 pulses 125 may be divided into 6 sets of 7 pulses, with 140 microseconds or more of no transmission (e.g., a pulse-length delay 126 during which the transmitter does not transmit) between each set. Further, in some examples, the first 63 pulses 124 may be separated from the last 42 pulses 125 by pulse-length delay 126. The total length of a transmission may be (105 pulses+6 pulse-length delays)*140 microseconds or 15.54 milliseconds or more for longer pulse intervals.

In various examples, the set of phases of the first 63 pulses of each pulse group of a first transmitter (e.g., TX1) may be different than the set of phases of the first 63 pulses of each pulse group of another transmitter (e.g., TX3). For example, the set of phases of the first 63 pulses of each pulse group may be indicative of the transmitter from which the pulse group emanated. For example, the set of phases of the first 63 pulses 124 of each pulse group of TX1 may be unique (or unique within a geographical region) to TX1, and, the set of phases of the first 63 pulses of each pulse group of TX3 may be unique (or unique within a geographical region) to TX3.

Thus, the set of phases of the first 63 pulses of each pulse group may be indicative of the transmitter from which the pulse group emanated. Further detail regarding pulse phase coding is given with regard to FIGS. 1C, 1D, and 8A-8C.

In various examples, the set of phases of the first 63 pulses of each pulse group of each transmitter may vary from epoch to epoch. Varying the set of phases of the first 63 pulses each epoch may make spoofing more difficult.

In various examples, last 42 pulses 125 may be used to encode a time and/or a data message. As a non-limiting example, last 42 pulses 125 may be divided into six sets of seven pulses, with a respective pulse-length delay 126 between each set of seven pulses. The phases of each of the seven pulses of each set may represent a 6-bit symbol (or, in some examples, a 7-bit symbol) for data encoding. The time and data message may be transmitted over one epoch using 420 pulses. The time message may be transmitted using 84 of the 420 pulses. The time message may be encoded using a Reed Solomon FEC encode using 6-bit symbols, six data symbols and six parity symbols (twelve symbols total). The data message may be transmitted using 336 of the 420 pulses. The data message may be encoded using a Reed Solomon FEC encode using 6-bit symbols, 22 data symbols and 26 parity symbols (48 symbols total).

FIG. 1B illustrates a pulse-group duration 123, which is a duration of time defined between the start of the first pulse of a pulse group (e.g., start of pulse group 130) and the start of the first pulse of a next pulse group (not illustrated in FIG. 1B) (e.g., end of pulse group 132).

The durations illustrated and described with regard to FIG. 1B are given as non-limiting examples. Further, total number of pulses, number of first pulses 124 (or pulses used to acquire the signal), number of last pulses 125 (or pulses used to encode data), number of sets of pulses used to encode data, and number of pulses in each set are non-limiting examples.

Figure 1C:
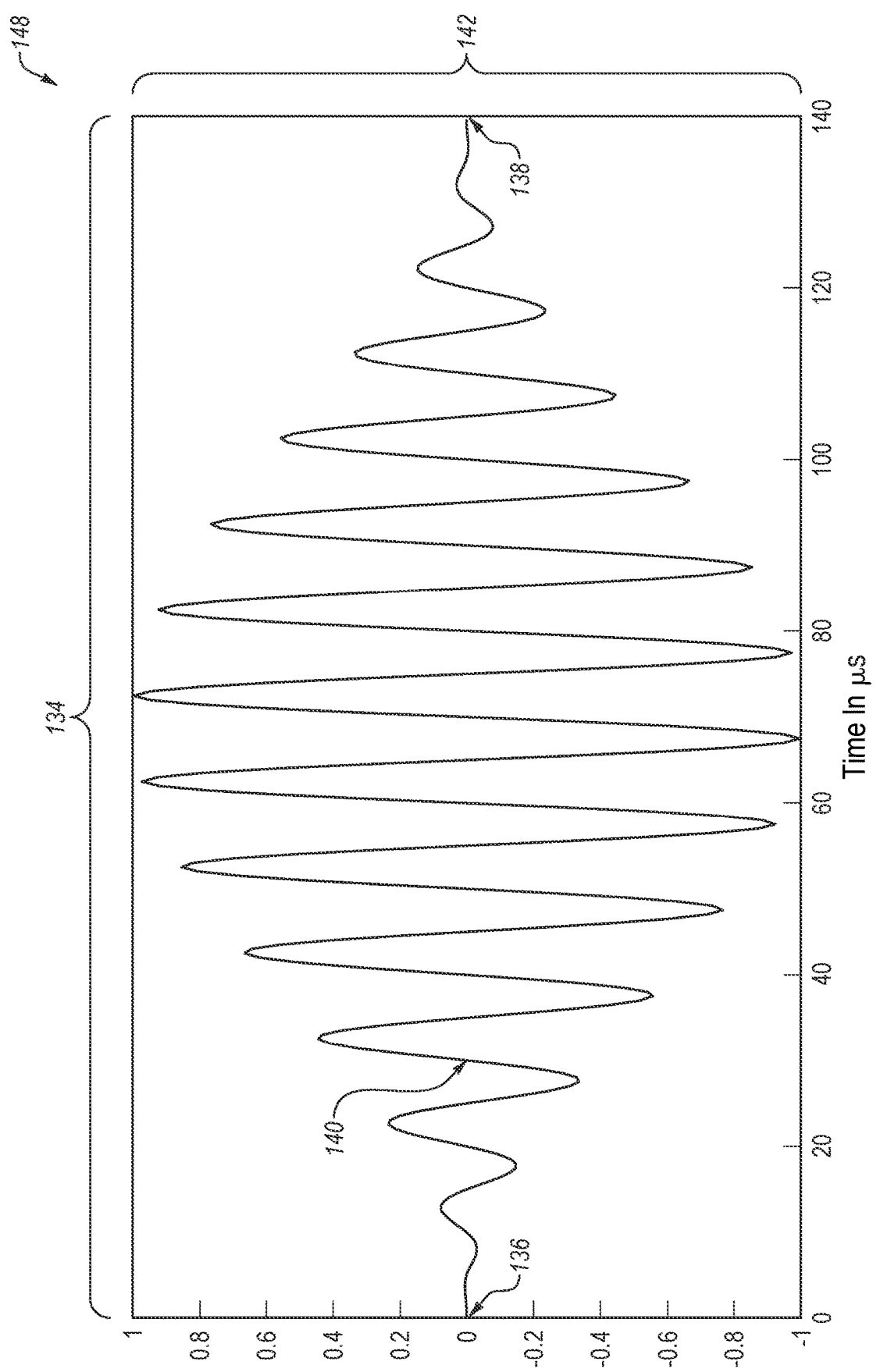
FIG. 1C illustrates an example pulse according to one or more examples.

FIG. 1C illustrates pulse 148 of a ranging signal according to one or more examples. Pulse 148 may be encoded with timing information, e.g., a point in the pulse may be indicative of a timing event. As a non-limiting example, the sixth zero crossing (e.g., zero crossing 140) may be used by a receiver as an indication of a timing event, e.g., for positioning, navigation, or timing for a positioning technique (including, as non-limiting examples, multilateration or hyperbolic position estimation calculations).

FIG. 1C further illustrates pulse start point 136, which may be a point in time at which the pulse 148 starts, e.g., moves from a point of rest either positive or negative. FIG. 1C also illustrates pulse end point 138, which may be the point in time at which the pulse 148 ends, e.g., returns to a stable point of rest. Together, pulse start point 136 and pulse end point 138 define a pulse duration 134 of pulse 148. Alternatively, because transmissions after a certain point in the pulse 148 may include ringing, pulse end point 138 may be defined as a pulse duration 134 after pulse start point 136. FIG. 1C further illustrates pulse amplitude 142, which may be the amplitude of the pulse 148 from a negative peak value to a positive peak value.

Figure 1D:
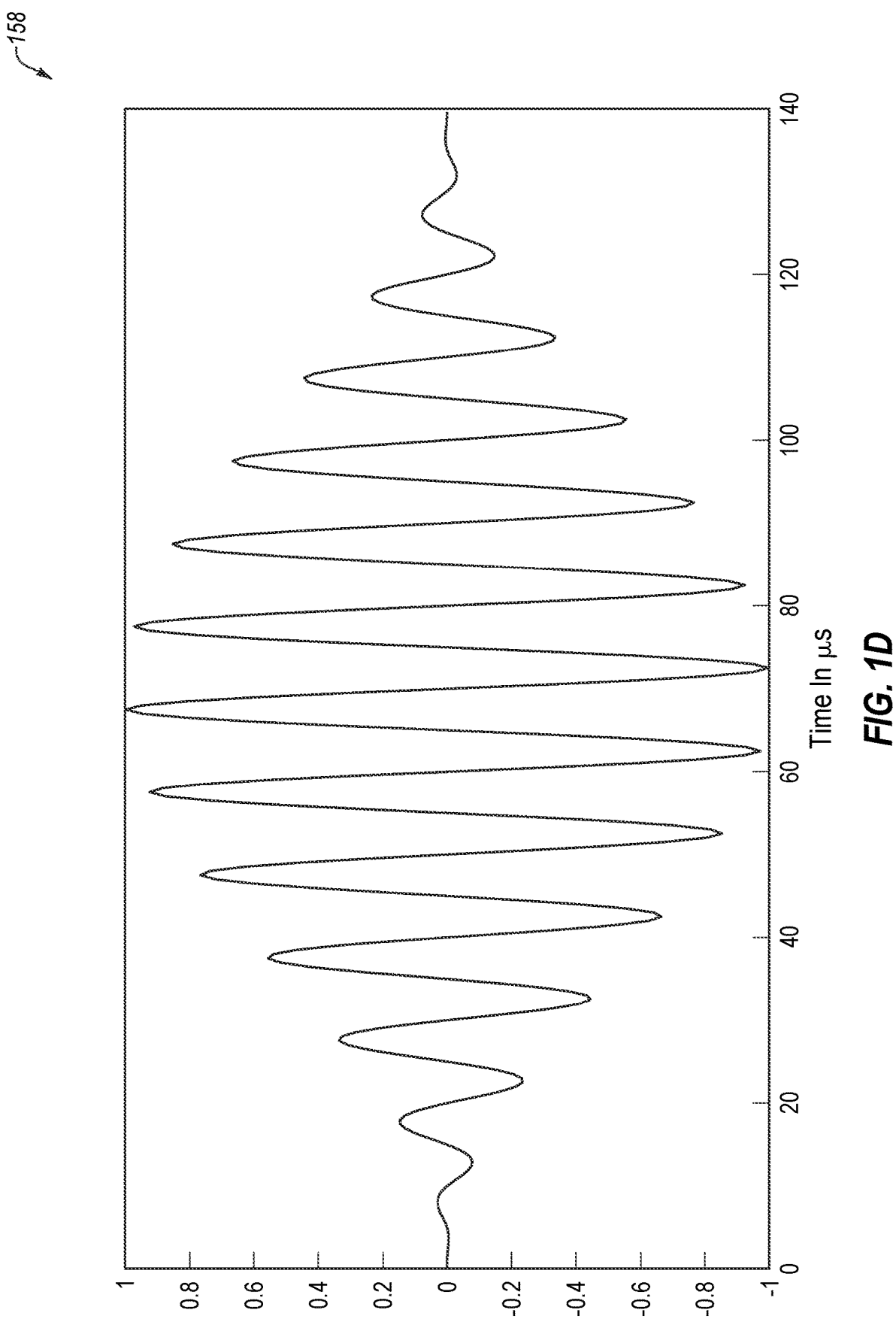
FIG. 1D illustrates a pulse according to one or more examples.

FIG. 1D illustrates another example pulse 158 according to one or more examples. Pulses may be binary-phase coded with phase codes. For example, pulse 148 of FIG. 1C may encode a +1 and pulse 158 of FIG. 1D may encode −1 because pulse 158 may have the opposite phase as pulse 148. Further detail regarding pulse phase coding is given with regard to FIGS. 8A-8C.

FIG. 2 illustrates a pulse-ordering scheme 200 for encoding the time and data messages according to one or more examples. For example, FIG. 2 includes one example assignment of six sets of seven pulses used to encode the messages in a pulse group. In FIG. 2, 10 pulse groups (e.g., of an epoch) are illustrated. Each of the illustrated sets of seven pulses is assigned as either a time message pulse set or a data message pulse set. Varying the arrangement within an epoch may decrease the impact of burst errors on data transmission, and more specifically, improve performance of forward error correction techniques. The assignment schemes may be chosen according to any suitable algorithm, as a non-limiting example, an algorithm that improves performance of Reed-Solomon type of FEC blocks.

FIG. 2 illustrates two different types of data that may be encoded in the 42 pulses designated for data encoding in accordance with one or more examples (e.g., the last 42 pulses 125 of FIG. 1B). As a non-limiting example, FIG. 2 illustrates time-message pulse sets ("T"), and data-message pulse sets ("D"). Use of fewer types of pulses or other types of pulses, additionally or alternatively to those discussed herein, does not exceed the scope of this disclosure.

As described above with regard to FIG. 1B, the first 63 ranging pulses 124 of a pulse group may be used at a receiver to extract one or more times of arrival of one or more of the pulses, e.g., which may be used to determine position information of a receiver. For example, in some examples, an average time of arrival may be determined for all of the first 63 ranging pulses.

Time-message pulses (which may be alternatively referred to herein as "timing pulses") may collectively encode timing information. As a non-limiting example, a transmitter may be configured to keep a count of epochs, e.g., as an "epoch number" and may transmit the epoch number encoded in the time-message pulses of each epoch. The time-message pulses may include one or more error-correction bits, e.g., according to a Reed-Solomon error-correction scheme. As an example of encoding timing information, the epoch number may be a 32-bit number and the 84 time-message pulses of an epoch may collectively encode the epoch number and the one or more error-correction bits. For example, the 84 time-message pulses encode 12 six-bit symbols. Of these, six symbols (36 bits) are used to encode the time information and six symbols (36 bits) are used for error correction.

Data-message pulses (which may be alternatively referred to herein as "data pulses") may collectively encode a data message. Data-message pulses may communicate a message, e.g., from a system operator of a Loran system to a Loran receiver or to a user of a Loran receiver. Non-limiting examples of information transmitted via data-message pulses include differential corrections, almanac information for transmitters and differential monitors, or messages, including, as non-limiting examples, emergency alerts or weather alerts. The data-message pulses may further include one or more error-correction-message pulses, e.g., an FEC block according to a Reed-Solomon error-correction scheme. For example, the 336 data-message pulses encode 48 six-bit symbols. Of these, 22 symbols (132 bits) are used to encode the data message and 26 symbols (156 bits) are used for error correction.

As a non-limiting example, FIG. 2 illustrates ten pulse groups 202, each including six pulse sets 204. Thus, FIG. 2 illustrates 60 pulse set positions of an epoch. A "pulse set" may refer to seven pulses that encode six bits of information, e.g., in the last 42 pulses of a pulse group.

During an epoch, a transmitter may transmit the encoded pulse sets of the epoch according to a pulse set-ordering scheme such as pulse-set-ordering scheme 200. By arranging the different types of pulse set 206 according to pulse-set-ordering scheme 200, a receiver may be able to determine which pulses are of which type.

In various examples, the epoch number in time-message pulses or data in the data-message pulses may be encrypted. For example, the epoch number, encoded into the time-message pulses, may be encrypted prior to encoding. As another example, the data message, encoded into the data-message pulse sets, may be encrypted prior to encoding. A single encrypted data message may span one or more epochs. Encryption of the epoch number or data message may be such that the epoch number or data message may be indecipherable without an encryption key. Thus, a recipient of all of the pulse sets of an epoch, and in possession of the pulse-set-ordering scheme 200, but not in possession of the encryption key, may be able to recover the symbols encoded by the time-message pulses or the data-message pulses, but may not be able to decrypt the epoch number or the data.

Alternatively, in various examples, the timing information may not be encrypted, e.g., the timing information may be transmitted in the clear. Not encrypting the timing information may enable a receiver of the time-message pulse sets to obtain timing information, e.g., an epoch number, without possessing an encryption key. Allowing a receiver to obtain the epoch number without an encryption key may allow the receiver to obtain information (e.g., more accurate timing information by correcting dither, which will be described in more detail below).

However, transmitting the timing information in the clear may leave the timing information vulnerable to spoofing. In various examples, the timing information may be transmitted in the clear (e.g., in time-message pulses) and second timing information may be transmitted, encrypted, in data-message pulses. The second timing information may be encrypted and thus, less vulnerable to spoofing than the timing information transmitted in the clear.

Further, the second timing information may include additional timing information not included in the first timing information, e.g., a leap second count. Including the additional timing information in the second timing information may allow receivers in possession of the encryption key to obtain more detailed or more accurate timing information than is obtainable by receivers not in possession of the encryption key. Further, including the additional timing information in the second timing information may allow the timing information of the time-message pulses to not include the additional timing information, which may allow the number of time-message pulses to be reduced or the time-message pulses to include additional error-correction bits.

Additionally, or alternatively, one or more examples relate, generally, to controlling usability of ranging signals to limit accurate use of the ranging signals to certain recipients by adding a time offset (called a "dither offset," "dithering offset," or just "dither") that a specific recipient with a dither correction can correct for prior to using the ranging signals. As a non-limiting example, controlling usability may facilitate privatization of the ranging signals and a navigation system using the same.

Figure 3:
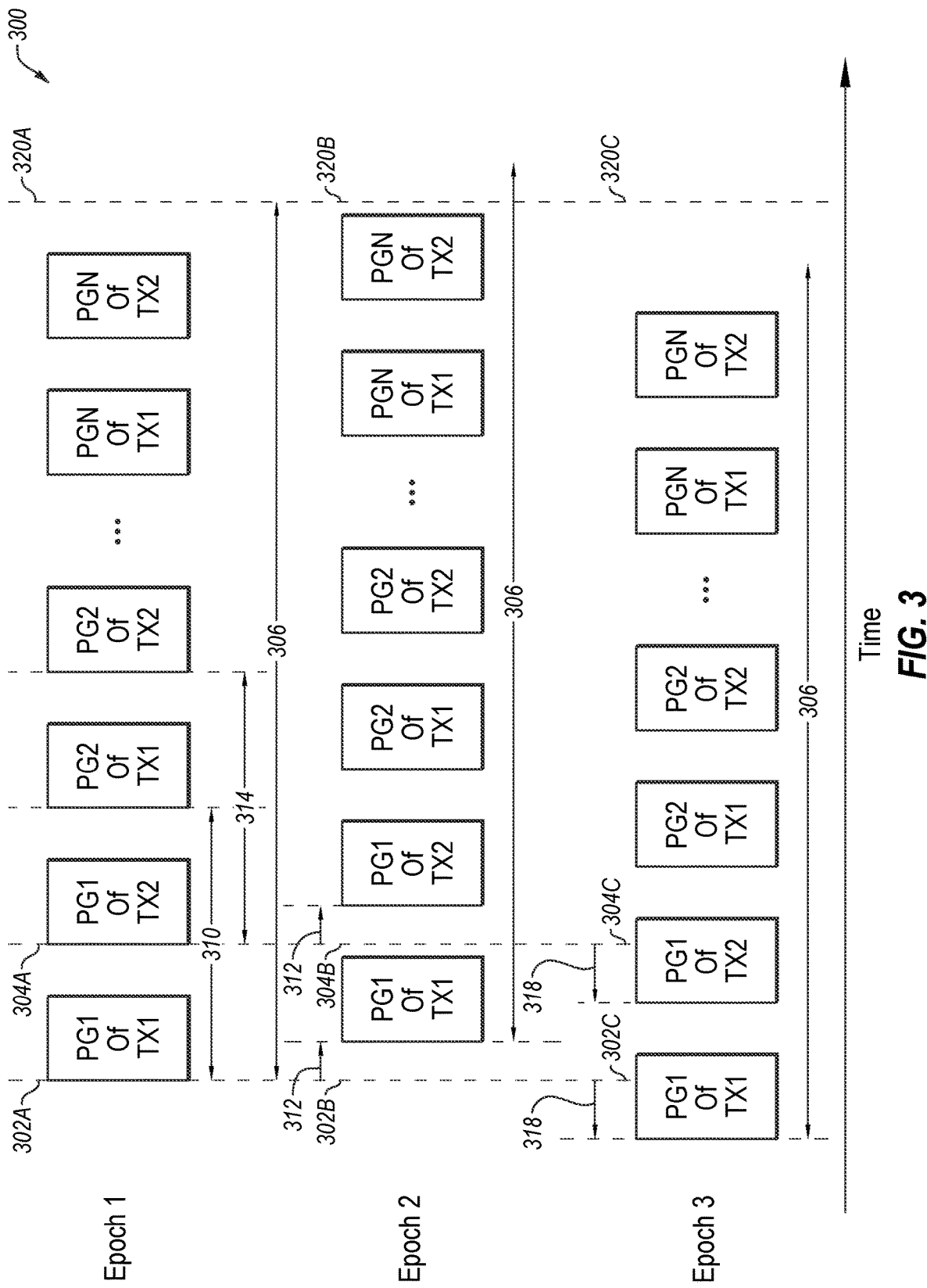
FIG. 3 illustrates example timings of pulse groups within epochs exhibiting chain-level dithering according to one or more examples.

FIG. 3 is a timing diagram 300 that illustrates example timings of pulse groups having dithering, according to one or more examples. For example, FIG. 3 illustrates timings of pulse groups of three epochs (Epoch 1, Epoch 2, and Epoch 3). The pulse groups that occur during Epoch 1 are not dithered, e.g., with respect to a nominal epoch start time 302A. (In the present disclosure, pulse groups that occur during an epoch may be referred to as pulse groups "of" the epoch). The pulse groups of Epoch 2 are delayed with respect to a nominal epoch start time 302B and the pulse groups of Epoch 3 are advanced with respect to nominal epoch start time 302C.

FIG. 3 illustrates nominal epoch start times 302 (including nominal epoch start time 302A, which may be the nominal start time of Epoch 1, nominal epoch start time 302B, which may be the nominal start time of Epoch 2, and nominal epoch start time 302C, which may be the nominal start time of Epoch 3). Nominal epoch start time 302A, nominal epoch start time 302B, and nominal epoch start time 302A may be referred to collectively as nominal epoch start times 302. FIG. 3 also illustrates nominal subsequent-epoch start times 320 (including nominal subsequent-epoch start time 320A, which may be the end of Epoch 1 and the start time of a subsequent epoch, nominal subsequent-epoch start time 320B, which may be the end of Epoch 2 and the start time of a subsequent epoch, and nominal subsequent-epoch start time 320C, which may be the end of Epoch 3 and the start time of a subsequent epoch). Nominal subsequent-epoch start time 320A, nominal subsequent-epoch start time 320B, and nominal subsequent-epoch start time 320C may be referred to collectively as nominal subsequent-epoch start times 320. In various examples, Epochs 1, 2, and 3 may be sequential or non-sequential. In other words, Epoch 2 may or may not follow Epoch 1. Nominal subsequent-epoch start times 320 may follow nominal epoch start times 302 by an epoch duration 306 (i.e., the duration of an epoch). A nominal subsequent-epoch start time may be the end of a previous epoch. A nominal start time of an epoch may be the nominal subsequent-epoch start time of the preceding epoch. For example, if Epoch 2 followed Epoch 1, nominal start time 302B would be nominal subsequent-epoch start time 320A.

The pulse groups of Epoch 1 are illustrated without dithering. For example, the first pulse group of the first transmitter ("PG1 of TX1") is illustrated as beginning at nominal epoch start time 302A, i.e., PG1 of TX1 was not dithered (delayed or advanced) from nominal epoch start time 302A. The second pulse group of the first transmitter ("PG2 of TX1") starts at group-repetition interval 310 after nominal epoch start time 302A. Also, the first pulse group of the second transmitter ("PG1 of TX2") starts at nominal second-pulse-group start time 304A, i.e., PG1 of TX2 was not dithered from nominal second-pulse-group start time 304A. Also, PG2 of TX2 starts at group-repetition interval 314 after nominal second-pulse-group start time 304A. In various examples, group repetition interval 310 may be the same or a different duration as group repetition interval 314.

The pulse groups of Epoch 2 are delayed by delay offset 312 from nominal epoch start time 302B. For example, PG1 of TX1 of Epoch 2 is delayed from nominal epoch start time 302B by delay offset 312. Similarly, PG1 of TX2 of Epoch 2 is delayed from nominal second-pulse-group start time 304B by delay offset 312. Likewise, all pulse groups of Epoch 2 are delayed by delay offset 312. The timing of pulse groups (e.g., dithered or un-dithered) applies equally to all pulses of the pulse groups. For example, all of the pulses of PG1 of TX1 of Epoch 2 are delayed by delay offset 312. Despite the delay of Epoch 2, a subsequent epoch begins at nominal subsequent-epoch start time 320B and not at nominal subsequent-epoch start time 320B plus delay offset 312. To prevent pulses from different epochs from being transmitted at the same time, in various examples, the delay offset 312 may be selected to be shorter than half of a nominal duration between the end of a last pulse of a last pulse group of an epoch and the beginning of a first pulse of a first pulse group of a subsequent epoch.

The pulse groups of Epoch 3 are advanced by advance offset 318. For example, PG1 of TX1 of Epoch 3 is advanced from nominal epoch start time 302C by advance offset 318. Similarly, PG1 of TX2 of Epoch 3 is advanced from nominal second-pulse-group start time 304C by advance offset 318. Likewise, all pulse groups of Epoch 3 are advanced by advance offset 318. Despite this advance, a subsequent epoch nominally would begin at nominal subsequent-epoch start time 320C and not after nominal subsequent-epoch start time 320C minus advance offset 318. To prevent pulses of different epochs from being transmitted at the same time, in various examples, the advance offset 318 may be selected to be shorter than a half of nominal duration between the end of a last pulse of a last pulse group of an epoch and the beginning of a first pulse of a first pulse group of a subsequent epoch.

The term "chain-level-dithering interval" may refer to a time interval by which all pulses of all pulse groups of all transmitters of a group of transmitters (which may be referred to as a chain) are delayed or advanced (relative to a nominal timing). A chain-level-dithering interval (e.g., delay offset 312 or advance offset 318) may apply for the duration of an epoch. In subsequent epochs, the pulse groups of all transmitters of a group of transmitters may be delayed or advanced by a different chain-level-dithering interval, or by none at all. Chain-level dithering is the dithering of a chain of transmitters by a chain-level-dithering interval over an epoch.

Figure 4:
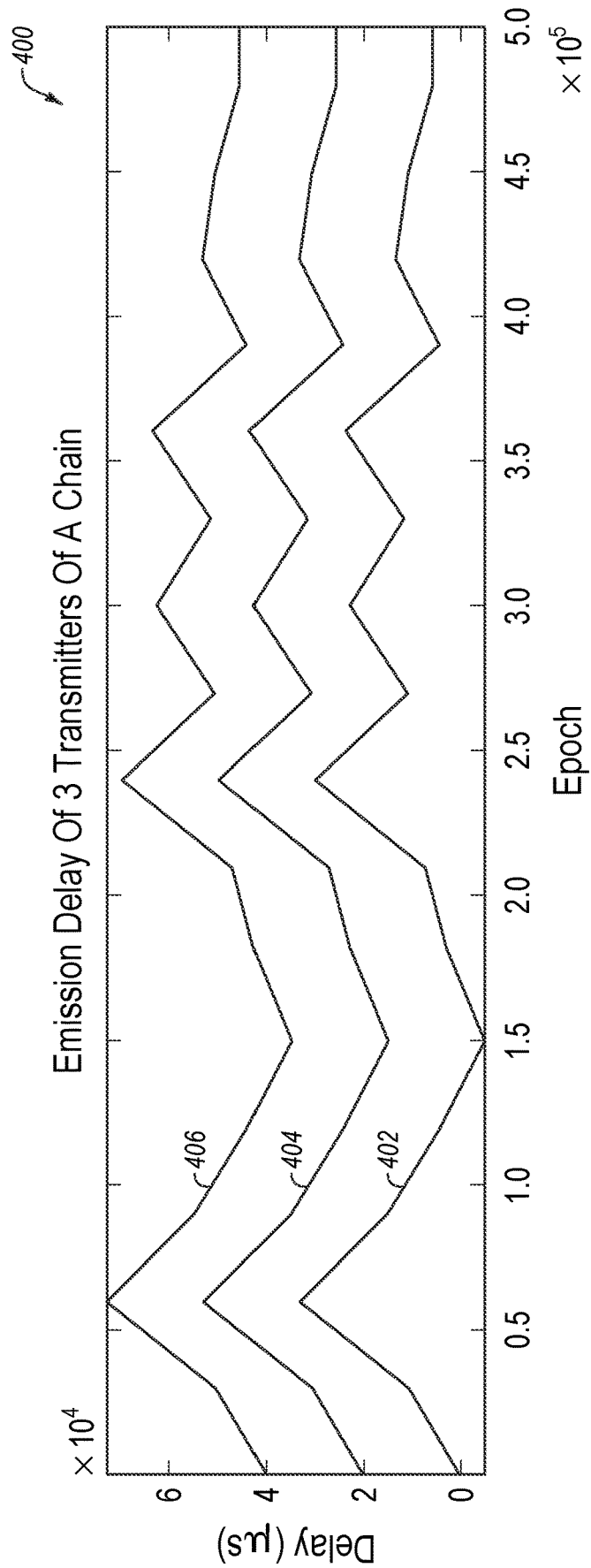
FIG. 4 illustrates an example of chain-level dithering over time according to one or more examples.

As an example of dithering, FIG. 4 illustrates dither offsets 400 of emission delay of three transmitters of a chain over time. For example, FIG. 4 illustrates a first emission delay 402 of a first transmitter of a chain, a second emission delay 404 of a second transmitter of the chain, and a third emission delay 406 of a third transmitter of the chain. Dither offsets 400 (including first emission delay 402, second emission delay 404, and third emission delay 406) may include offsets resulting from chain-level dithering, transmitter-level dithering, and masking dithering. However, because of differences in magnitude between chain-level dithering and transmitter-level dithering and between chain-level dithering and masking dithering, in FIG. 4, transmitter-level dithering and masking dithering may not be apparent. Thus, FIG. 4 is scaled to particularly illustrates chain-level dithering. (Transmitter-level dithering and masking dithering are explained more fully below.)

Third emission delay 406 is delayed relative to second emission delay 404 by a nominal emission delay (e.g., 20,000 microseconds). Similarly, second emission delay 404 is delayed relative to first emission delay 402 by the nominal emission delay. FIG. 4 illustrates that each of first emission delay 402, second emission delay 404, and third emission delay 406 are substantially parallel. First emission delay 402, second emission delay 404, and third emission delay 406 are substantially parallel because all of first emission delay 402, second emission delay 404, and third emission delay 406 are delayed by the same chain-level-dithering interval each epoch.

In various examples, a change in dithering of a chain (i.e., a change in dithering of all of the pulses of all of the pulse groups transmitted by a chain of transmitters) over time may follow a trend. For example, FIG. 4 illustrates changes in dithering of the chain following a ramp pattern between several points (e.g., pseudo-randomly selected points). For example, the chain-level dithering exhibited by dither offsets 400 may have several random values and may follow a ramp between the several random values. Thus, in the example illustrated in FIG. 4, between any two epochs, the change in dithering may be small relative to a change over many (e.g., 50,000 epochs). For example, at Epoch 1, the chain dithering may be 0 microseconds, at Epoch 2, the chain dithering may be slightly longer (e.g., 0.4 microseconds longer), and at Epoch 50,000, the chain dithering may be 20,000 microseconds. Thus, the magnitude of the chain-level dithering may be on the order of tens of thousands of microseconds when considered over many epochs while the magnitude of change between any two epochs may be much smaller, e.g., 1 microsecond or less.

Figure 5:
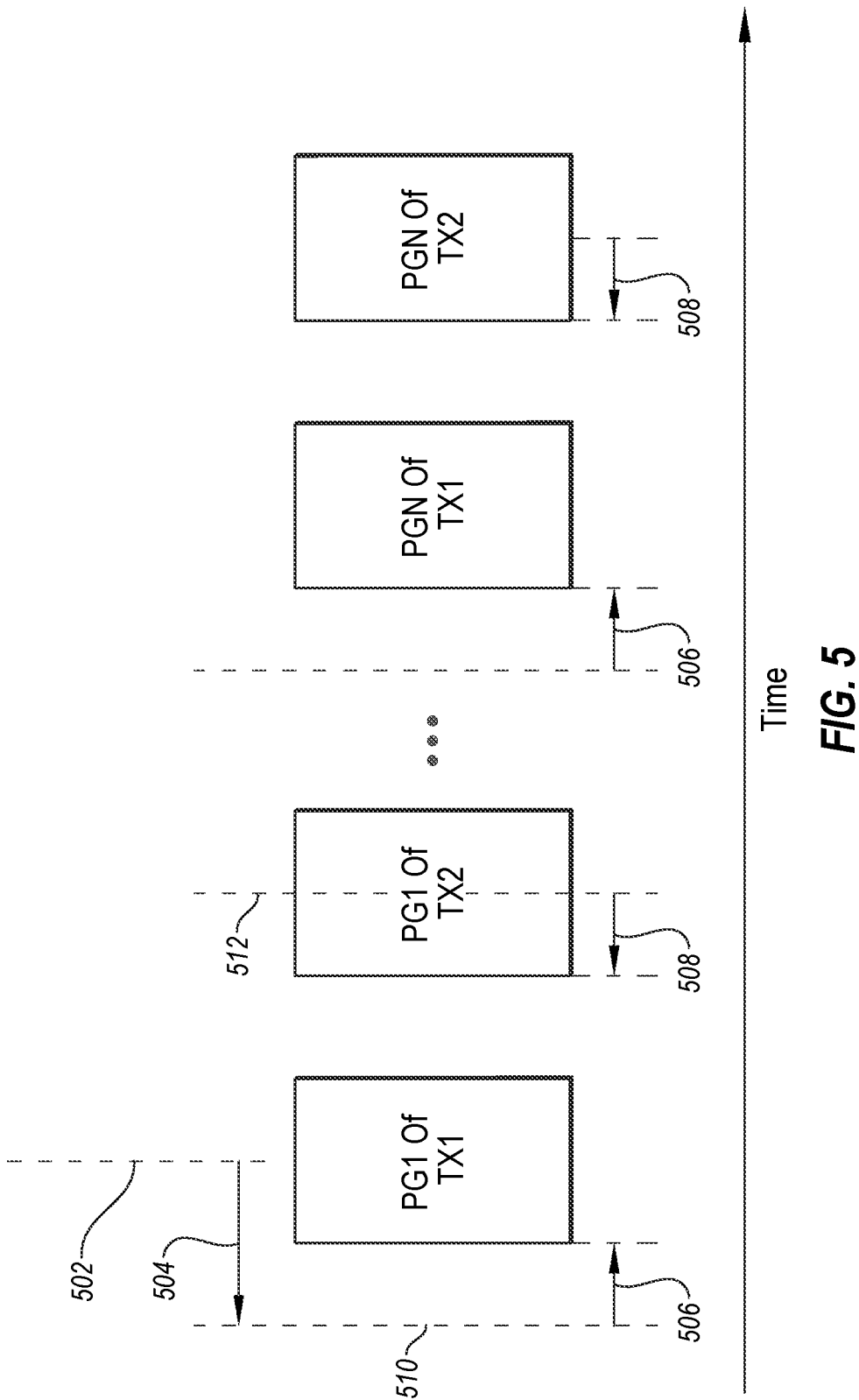
FIG. 5 illustrates timings of pulse groups within an epoch exhibiting chain-level dithering and transmitter-level dithering according to one or more examples.

In addition to chain-level dithering, individual transmitters may individually dither timing of pulse groups. For example, FIG. 5 illustrates transmitter-level dithering and chain-level dithering. The transmitter-level dithering may be analogous to the chain-level dithering in that transmitter-level dithering may involve dithering all pulses of all pulse groups for an epoch. However, in contrast to chain-level dithering, transmitter-level dithering may be applied by transmitters individually and not by a chain of transmitters together.

FIG. 5 illustrates an Epoch 4 that includes both chain-level dithering and transmitter-level dithering. FIG. 5 illustrates a nominal epoch start time 502. FIG. 5 illustrates a chain-level-dithering interval 504 by which all of the pulse groups (including, e.g., PG1 of TX1, PG1 of TX2, PGN of TX1 and PGN of TX2) of a chain (e.g., TX1 and TX2) are advanced for the duration of Epoch 4. That is, based on the chain-level-dithering interval, the first pulse of Epoch 4 (PG1 of TX1) would begin at chain-level-dithered start time 510, which is advanced by chain-level-dithering interval 504 from nominal epoch start time 502.

However, FIG. 5 illustrates that PG1 of TX1 is, in addition, delayed by transmitter-level delay offset 506. For example, during Epoch 4, TX1 delays all of its pulse groups by transmitter-level delay offset 506.

Also, FIG. 5 illustrates that the pulse groups of TX2 are advanced (e.g., relative to chain-level-dithered second-pulse-group start time 512) by transmitter-level advance offset 508. Transmitter-level delay offset 506 is independent of transmitter-level advance offset 508.

Figure 6:
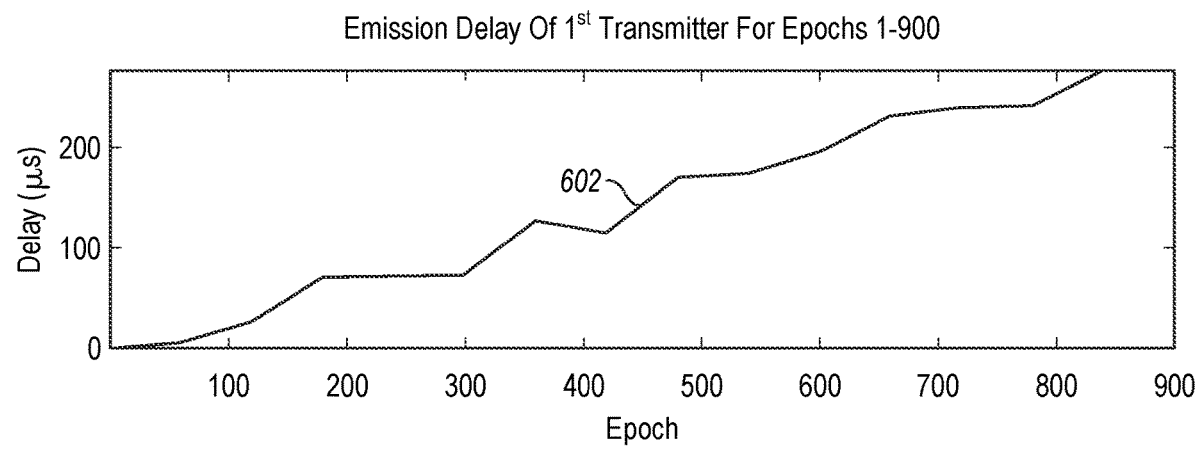
FIG. 6 illustrates a transmitter-level dithering over time according to one or more examples.

The term "transmitter-level-dithering interval" may be a time interval by which all pulse groups of a particular transmitter are delayed or advanced (relative to a nominal timing or relative to a nominal timing and a chain-level dither). A transmitter-level-dithering interval may apply for the duration of an epoch. In subsequent epochs, the pulse groups of the particular transmitter may be delayed or advanced by a different transmitter-level-dithering interval. In some cases, all pulse groups of each transmitter of each epoch may be delayed by a different transmitter-level-dithering interval, or by no transmitter-level-dithering interval. As an example of using a different transmitter-level-dithering interval each epoch, FIG. 6 illustrates dither offsets 602 of Emission Delay of a $1^{st}$ Transmitter for example Epochs 1-900. Transmitter-level dithering is the dithering of a particular transmitter by a transmitter-level-dithering interval over an epoch.

As an example of dithering, FIG. 6 illustrates dither offsets 602 of emission delay of one transmitter over time. Dither offsets 602 may include offsets resulting from chain-level dithering, transmitter-level dithering, and masking dithering. However, because of differences in magnitude between transmitter-level dithering and chain-level dithering, in FIG. 6, chain-level-dithering may appear as a general trend. Further, because of the difference between transmitter-level dithering and masking dithering, masking dithering may not be apparent in FIG. 6. Thus, FIG. 6 is particularly scaled to illustrate transmitter-level dithering. For example, the upward trend from a 0 microsecond delay to over a 200 microsecond delay that occurs between the 0th epoch to the 900th epoch may be a result of chain-level dithering (e.g., the chain-level dithering particularly illustrated in FIG. 4). In particular, dither offsets 602 as illustrated in FIG. 6 may be a scaled-up view of first emission delay 402 of FIG. 4. (Chain-level dithering is explained more fully above and masking dithering is explained more fully below.) Transmitter-level dithering may be observed in the deviations from what would otherwise be a straight line from the 0 microsecond delay to the over-200 microsecond delay that occurs between the 0th epoch to the 900th epoch.

In various examples, a change in dithering of a transmitter (i.e., a change in dithering of all of the pulses of all of the pulse groups transmitted by a transmitter) over time may follow a trend. For example, the dither offsets 602 may have several random values and may follow a ramp between the several random values. For example, FIG. 6 illustrates changes in dithering of the transmitter following a ramp pattern between several points. Thus, in the example illustrated in FIG. 6, between any two epochs, the change in dithering may be small relative to a change over many (e.g., 50 respective epochs). For example, at the 300th epoch, the transmitter dithering may be a delay of 60 microseconds, at the 301st epoch, the transmitter dithering may be slightly longer delay (e.g., 1 microsecond longer), and at the 350th epoch, the transmitter dithering may be a delay of 110 microseconds. Thus, the magnitude of the transmitter-level dithering may be on the order of tens or hundreds of microseconds when considering many epochs while the magnitude of change between any two adjacent epochs may be much smaller (e.g., 1 microsecond or less).

Additionally, in various examples, a magnitude of change caused by a chain-level-dithering interval over time may be larger or smaller (e.g., by an order of magnitude or more) than a magnitude of change caused by a transmitter-level-dithering interval over the same time. For example, a magnitude of change caused by the dither offsets 400 of FIG. 4 may be one hundred times greater in magnitude than the magnitude of change caused by dither offsets 602 of FIG. 6. Stated another way, in terms of overall dithering over time, chain-level dithering may impact an instantaneous dither, i.e., the dither between two subsequent epochs, 100 times more than the transmitter-level dithering impacts the instantaneous dither. For example, transmitter-level dithering may account for variations in dither offsets 602 that are on the order of tens of microseconds over the course of epochs 1 to 900 while chain-level dithering may account for the overall trend of dither offsets 602 (e.g., between zero microseconds to exceeding 200 microseconds) over the course of epochs 1 to 900.

Additionally, in various examples, the duration of a ramp of chain-level dithering may be different (e.g., by an order of magnitude or more) than a duration of a ramp of transmitter-level-dithering interval. For example, the chain-level-dither offsets (which chain-level dither offsets FIG. 4 is particularly scaled to illustrate) may follow a ramp between two values for a duration of 30,000 epochs while the transmitter-level-dither offsets (which transmitter-level dither offsets FIG. 6 is particularly scaled to illustrate) may follow a ramp between two values for a duration of 60 respective epochs.

The magnitude of the chain-level-dithering interval and/or the transmitter-level-dithering interval may be selected to be smaller than a default duration between pulse groups (or epochs). For example, the chain-level-dithering interval and the transmitter-level-dithering interval may be selected such that even if a chain and transmitter were delayed during a first epoch, and the chain and transmitter were advanced during the next epoch, an overlap of pulse groups would be avoided. As another example, the transmitter-level-dithering interval may be selected such that if pulses of a first transmitter were delayed, and pulses of a second transmitter were advanced, signals from the first and second transmitter would not overlap.

By dithering one or more pulse groups during one or more epochs (e.g., as illustrated by FIG. 3 and FIG. 5) it may be possible to privatize the signals of a system (e.g., a timing-dependent system). As a non-limiting example, receivers may depend on timing (e.g., the time of arrival of signals at the receiver) to calculate positioning, navigation, or timing information. If signals transmitted at one or more transmitters are dithered, the receiver may be unable to accurately calculate positioning, navigation, or timing information. In other words, the dithering may introduce errors in positioning, navigation, or timing information calculable at a receiver.

In various examples, one or more of the transmitters may dither signals according to a dithering schedule. The dithering schedule may include a pre-defined dithering schedule, which is a schedule of dithering intervals (e.g., chain-level-dithering intervals or transmitter-level-dithering intervals) to apply to signals transmitted during a number of epochs. A receiver, in possession of the dithering schedule, may be able to correct for the effects of the dithering on the received signals and thereby accurately calculate positioning, navigation, or timing information. Receivers without the dithering schedule may be unable to accurately calculate positioning, navigation, or timing information from the dithered signals.

Transmitters or chains may privatize their signals, e.g., by making accurate use of the signals dependent on possession of the dithering schedule. An operator of the transmitters may sell the dithering schedule, e.g., on a subscription basis.

In one or more examples, multiple levels of service may be defined to allow for various levels of accuracy calculable at a receiver. As a non-limiting example, transmitters may include two or more instances of dithering and sell the dithering schedules separately. Additionally or alternatively, dithering schedules including different degrees of accuracy may be sold. Specific users receive two keys, and lower level users a single key. The dither could be the sum of two terms, specific users would have access to both terms (via their keys), and lower level users could only access a coarse term (via their key).

The dithering schedule may be encrypted or be usable only with a key such that a receiver must possess a key to utilize the dithering schedule. The dithering at a chain or transmitter may be related to the epoch number. As a non-limiting example, the dithering schedule may include dithering intervals for each epoch number. Thus, the dithering schedule may be indexable by epoch number. As an example, the dithering schedule may include a function (e.g., an encryption algorithm) that may accept as input the key and the epoch number and may return corrections for dithering for one or more transmitters for that epoch. A receiver may use the corrections to correct pulses received during the epoch. Thus, possession of both the epoch number and the key may be critical for the accurate calculation of PNT information.

In various examples, the magnitude of the chain-level dithering and/or the transmitter-level dithering may be selected according to a ramp such that a receiver may be able to decode an epoch number from transmissions without fully correcting the dithering. For example, a magnitude of the chain-level dithering or the transmitter-level dithering may be selected to be great enough to render location calculations inaccurate, yet, at the same time, because of the ramp, and the relatively small difference between dithering of individual pulse groups, a receiver may be able to decode an epoch number from the broadcast cycle. Thus, during initialization of a receiver, the receiver may be able to obtain an epoch number that can then be used with the dithering schedule to correct the pulses. Additionally or alternatively, the ramps in the magnitudes of chain-level dithering or the transmitter-level dithering may prevent or render it difficult to resolve the dithering by averaging over epochs. For example, if the transmitter-level dithering were random, each epoch, with a mean value of zero, a receiver could observe a number of epochs and average out the dithering.

In addition to chain-level dithering and/or transmitter-level dithering, in various examples, masking dithering may be applied. The masking dithering may be used to mask trends in dithering. In particular, in cases where chain-level dithering and/or transmitter-level dithering is applied according to a ramp, masking dithering may obscure the one or more ramps and/or make predicting dithering more difficult or improbable.

Masking dithering may include pseudo-random dithering applied to pulse groups (including to all pulses of the pulse group) independently each epoch. The masking dithering may employ different amounts of dithering each epoch independent of the dithering of prior epochs. For example, in contrast to dithering following a ramp, the masking dithering may be independent each epoch. Thus, the offset imparted by masking dithering may be relatively highly different between one epoch and the next compared with the offset imparted by masking dithering over many epochs. The relatively high degree of difference between offsets of subsequent epochs of masking dithering may mask the effects of chain-level dithering and/or transmitter-level dithering, which may follow a ramp. For example, in the absence of the masking dithering, a receiver, e.g., a receiver that is not in possession of the dithering schedule, may be able, over time to observe a ramp of the chain-level dithering and/or the transmitter-level dithering (assuming the chain-level dithering and/or the transmitter-level dithering are according to the ramp) and predict the dithering of future pulse groups. However, with the masking dithering applied, a receiver is less able to observe the ramp of either the chain-level dithering or the transmitter-level dithering (in other words, it may take longer for a receiver to be able to observe the ramps of the chain-level and/or transmitter-level dithering).

Figure 7:
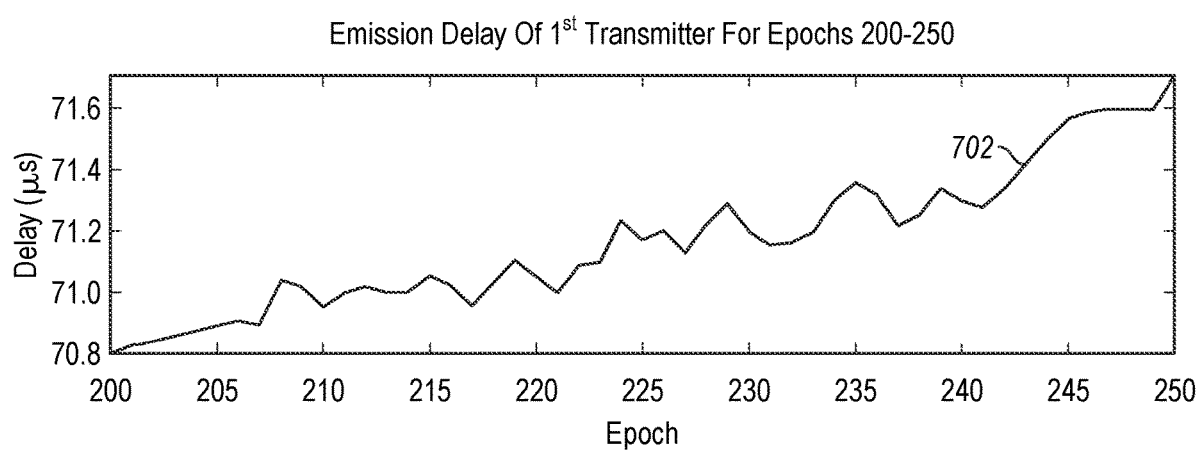
FIG. 7 illustrates a masking dithering over time according to one or more examples.

As an example of dithering, FIG. 7 illustrates dither offsets 702 of emission delay of one transmitter over time. Dither offsets 702 may include offsets resulting from chain-level dithering, transmitter-level dithering, and masking dithering. However, because of differences in magnitude between masking dithering and chain-level dithering and between masking dithering and transmitter-level dithering, in FIG. 7, chain-level-dithering and/or transmitter-level dithering may appear as a general trend. Thus, FIG. 7 particularly illustrates masking dithering. For example, from 200th epoch to 250th epoch of FIG. 7, the general upward trend (e.g., from 70.8 microseconds offset to 71.7 microseconds offset after 50 respective epochs) may be a result of chain-level dithering and/or transmitter-level dithering. Thus, dither offsets 702 as illustrated in FIG. 7 may be a scaled-up view of first emission delay 402 of FIG. 4 and a scaled up view of dither offsets 602 of FIG. 6.

In contrast to ramped dithering (e.g., as may be applied in chain-level dithering and/or transmitter-level dithering by utilizing a ramp), the masking dither is applied independently each epoch. The masking dither may be a pseudo-random dither (with a mean value of zero). However because the masking dither is independent each epoch, the masking dither does not cause any trend in the dither over time.

In various examples, masking dithering may change the timing of pulse groups by magnitudes (of timing) that are smaller or larger than (e.g., by an order of magnitude or more) the chain-level-dithering interval or the transmitter-level-dithering interval. For example, as illustrated in FIG. 7, for respective epochs, masking dithering may dither a signal on the order of 0.2 microseconds. However, because the masking dither has a mean value of zero, the masking dither does not cause a trend over time. In other words, the masking dither may account for a 0.2 microsecond swing between the 1st epoch and the 2nd epoch and the masking dither may account for a 0.2 microsecond swing between 1st epoch and the 300th epoch or 50,000th epoch. In other words, the magnitude of the masking dithering may be the same whether considering many epochs or single epochs.

As with the chain-level dithering and the transmitter-level dithering, the masking dithering may be included in the dithering schedule such that the masking dithering may be corrected for (e.g., by a receiver in possession of the dithering schedule) before calculating positioning, navigation, or timing information from the dithered signals.

Additionally or alternatively, one or more examples relate, generally, to providing for validation of pulse groups by encoding a signature in phases of pulses of pulse groups.

Figure 8A:
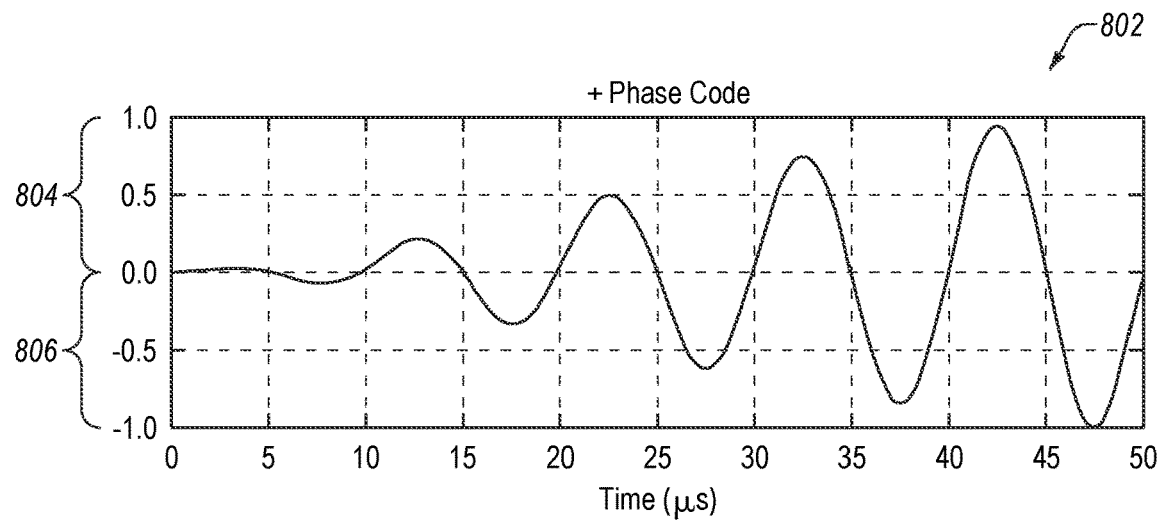
FIG. 8A is a graph that represents a positive-phase-code pulse for an example pulse according to one or more examples.
Figure 8B:
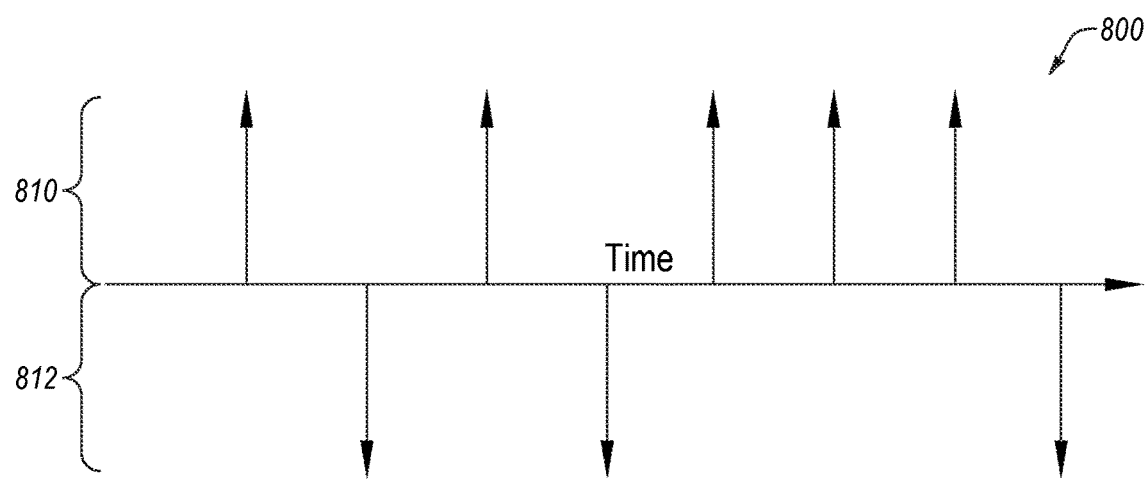
FIG. 8B is a graph that represents the example pulse group that includes positive-phase-code pulses (e.g., of FIG. 8A) and negative-phase-code pulses (e.g., of FIG. 8C) according to one or more examples.
Figure 8C:
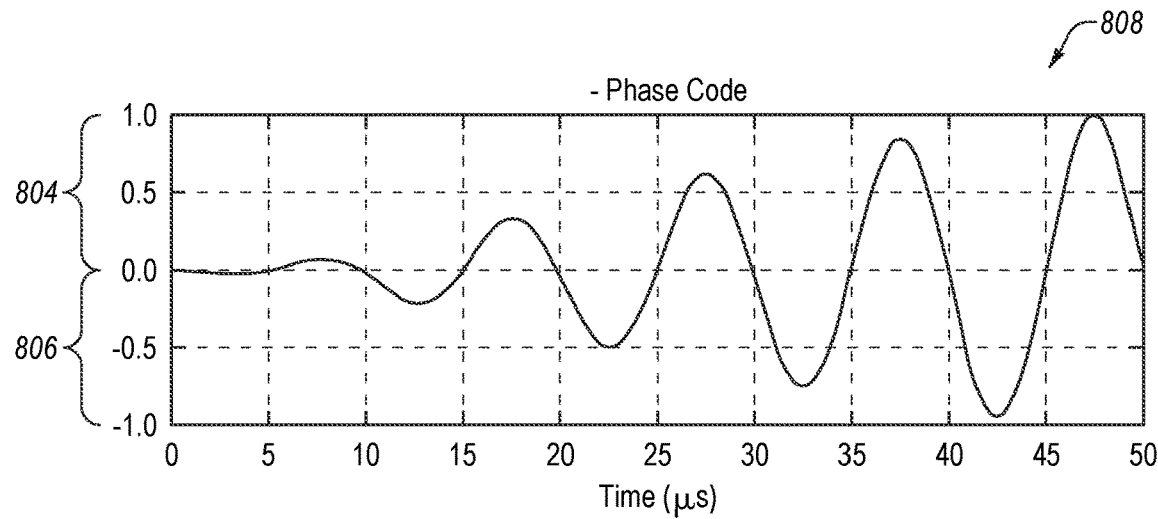
FIG. 8C is a graph that represents a negative-phase-code pulse for the example pulse according to one or more examples.

FIGS. 8A, 8B and 8C illustrate graphs that represent phase encoding of a pulse group 800, according to one or more examples.

FIG. 8A illustrates a graph that represents a positive-phase-code pulse for an example pulse group 800, and may be an expanded view of the beginning of pulse 148 of FIG. 1C. FIG. 8C illustrates a graph that represents a negative-phase-code pulse for the example pulse group 800, and may be an expanded view of the beginning of pulse 158 of FIG. 1D. A pulse, e.g., positive-phase-code pulse 802, may include multiple positive half cycles 804 and multiple negative half cycles 806. A pulse may have a positive phase code, e.g., as illustrated by positive-phase-code pulse 802 or a negative phase code, e.g., as illustrated by negative-phase-code pulse 808 (FIG. 8C). As a non-limiting example, positive-phase-code pulse 802 may begin with one of positive half cycles 804 of the carrier and negative-phase-code pulse 808 may begin with one of negative half cycles 806 of the carrier. Negative-phase-code pulse 808 may be 180 degrees out of phase with positive-phase-code pulse 802.

The zero-crossings of positive-phase-code pulse 802 and negative-phase-code pulse 808 may be the same, which may be relevant to timing, e.g., for positioning, navigation, or timing. Further, the frequency (or frequencies) of positive-phase-code pulse 802 and negative-phase-code pulse 808 may be the same.

FIG. 8B illustrates a pulse group 800 that includes positive-phase-code pulses 810 and negative-phase-code pulses 812. Accordingly, the phases of some or all of the pulses in the pulse group, collectively, may be used to encode information (e.g., a signature of a transmitter, time information, or a data message). For example, whether each of the pulses of pulse group 800 are a positive-phase-code pulse or a negative-phase-code pulse may encode a bit of data encoding information. Encoding information in the phases of pulses of a pulse group may not affect timing or other data encoding included in the pulse group. As described above with regard to FIG. 1B, one or more subsets of pulses in a pulse group may be phase-encoded. For example, ranging pulses (e.g., the first 63 pulses 124 of FIG. 1B) may encode a signature unique to a transmitter, timing pulses (e.g., some of the last 42 pulses 125 of FIG. 1B) may encode timing information, and data pulses (e.g., some of the last 42 pulses 125 of FIG. 1B) may encode a data message.

Phases of pulses of a pulse group may be used to allow for validation of a signal (and consequently data) to increase security of a system. For example, phases of pulses of a pulse group may be encoded to prevent (or increase the difficulty of) spoofing a signal from a transmitter of the system. In other words, a system may use phase-encoding for anti-spoofing purposes.

As a non-limiting example, a transmitter may phase pulses of pulse groups such that the transmitted pulse groups match a pulse phase signature. The transmitter may change pulse phase signatures each epoch according to a pulse-phase-signature schedule. As a non-limiting example, a transmitter may transmit a first pulse group that matches a first pulse phase signature in a first epoch in accordance with the pulse-phase-signature schedule and transmit a second pulse group that matches a second pulse phase signature in a second epoch according to the pulse-phase-signature schedule.

A receiver, in possession of the pulse-phase-signature schedule may be able to verify that the transmitter transmitted the signal, e.g., by comparing phases of the received pulse groups to the pulse-phase-signature schedule. Further the pulse-phase-signature schedule may be related to the epoch number. As a non-limiting example, the pulse-phase-signature schedule may include pulse phase signatures indexable by the epoch number.

The pulse-phase-signature schedule may be encrypted such that a receiver must possess a key to utilize the pulse-phase-signature schedule. As an example, the pulse-phase-signature schedule may include a function that may accept as input the key and the epoch number and may return an expected pulse-phase-signature for the epoch. A receiver may compare received pulse phases to the expected pulse-phase signature to authenticate the received signal.

Figure 9:
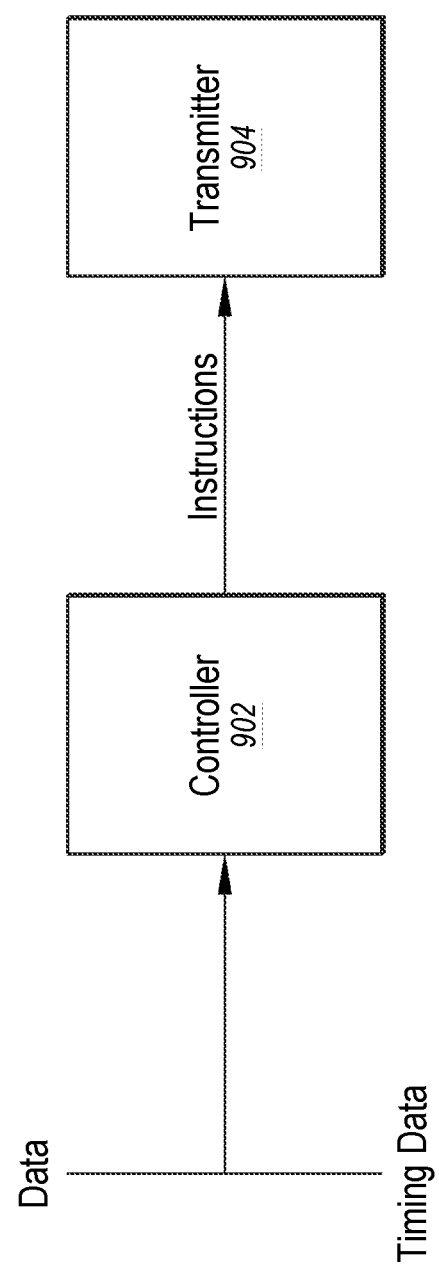
FIG. 9 illustrates a system to perform one or more disclosed techniques when generating radio waves (e.g., radio frequency groundwaves) for pulses, according to one or more examples.

FIG. 9 is a functional block diagram that illustrates an example of logical blocks of a system 900 configured to perform one or more disclosed techniques when generating radio frequency groundwaves for pulses, according to one or more examples. For example, system 900 includes controller 902 and transmitter 904. System 900 may be configured to transmit signals (e.g., pulses in pulse groups of broadcast cycles) according to one or more examples.

Controller 902 may be configured to receive data from, e.g., a control center. The data may include data for transmission, e.g., in data-message pulses (e.g., as described above with regard to FIG. 2).

Additionally or alternatively, controller 902 may be configured to receive timing data, e.g., from a time standard. The timing data may include a time of day, a pulse-per-second signal, or a frequency reference.

Controller 902 may calculate features (e.g., timing, phase, or pulse shape) of signals (e.g., pulses in pulse groups of broadcast cycles) to be transmitted. Controller 902 may calculate the features such that the signals (in aggregate) are according to one or more examples. Controller 902 may provide instructions to transmitter 904 that may be indicative of the signals to be transmitted at transmitter 904.

As a non-limiting example, in various examples, controller 902 may provide transmitter 904 with an indication of a phase of a pulse to be transmitted. Additionally or alternatively, controller 902 may provide transmitter 904 with an indication of when to transmit a pulse (e.g., a pulse trigger).

Transmitter 904 may transmit signals, e.g., pulses in pulse groups of broadcast cycles. Transmitter 904 may transmit pulses according to the instructions from controller 902. Additionally or alternatively, transmitter 904 may transmit a pulse with a phase according to the indication of phase provided by controller 902. Additionally or alternatively, transmitter 904 may transmit pulses at times indicated by controller 902, e.g., based on receiving a pulse trigger from controller 902.

As a non-limiting example, controller 902 may determine an inter-pulse interval such that system 900 has a unique (or unique within a geographical area) inter-pulse interval for identifying transmitter 904, e.g., as described above with regard to FIG. 1B. Controller 902 may provide instructions (e.g., pulse triggers) such that transmitter 904 transmits pulses of a pulse group having the determined inter-pulse interval.

As another non-limiting example, controller 902 may determine an arrangement of different types of pulses in pulse groups of broadcast cycles, e.g., according to a pulse-ordering scheme, e.g., as described above with regard to FIG. 2. Controller 902 may provide instructions such that transmitter 904 transmits pulses arranged in pulse groups of broadcast cycles according to the determined arrangement.

As another non-limiting example, controller 902 may calculate dither, e.g., according to a dithering schedule, e.g., as described above with regard to FIG. 3-FIG. 7. Controller 902 may provide instructions (e.g., pulse triggers) such that transmitter 904 transmits pulse groups advanced or delayed (e.g., dithered) according to the calculated dither.

As another non-limiting example, controller 902 may determine a phase encoding for phases of pulses of pulse groups of broadcast cycles, e.g., according to a pulse-phase-signature schedule, e.g., as described above with regard to FIGS. 8A-8C. Controller 902 may provide phase instructions such that transmitter 904 transmits pulses having phases according to the determined phase encoding.

Figure 10:
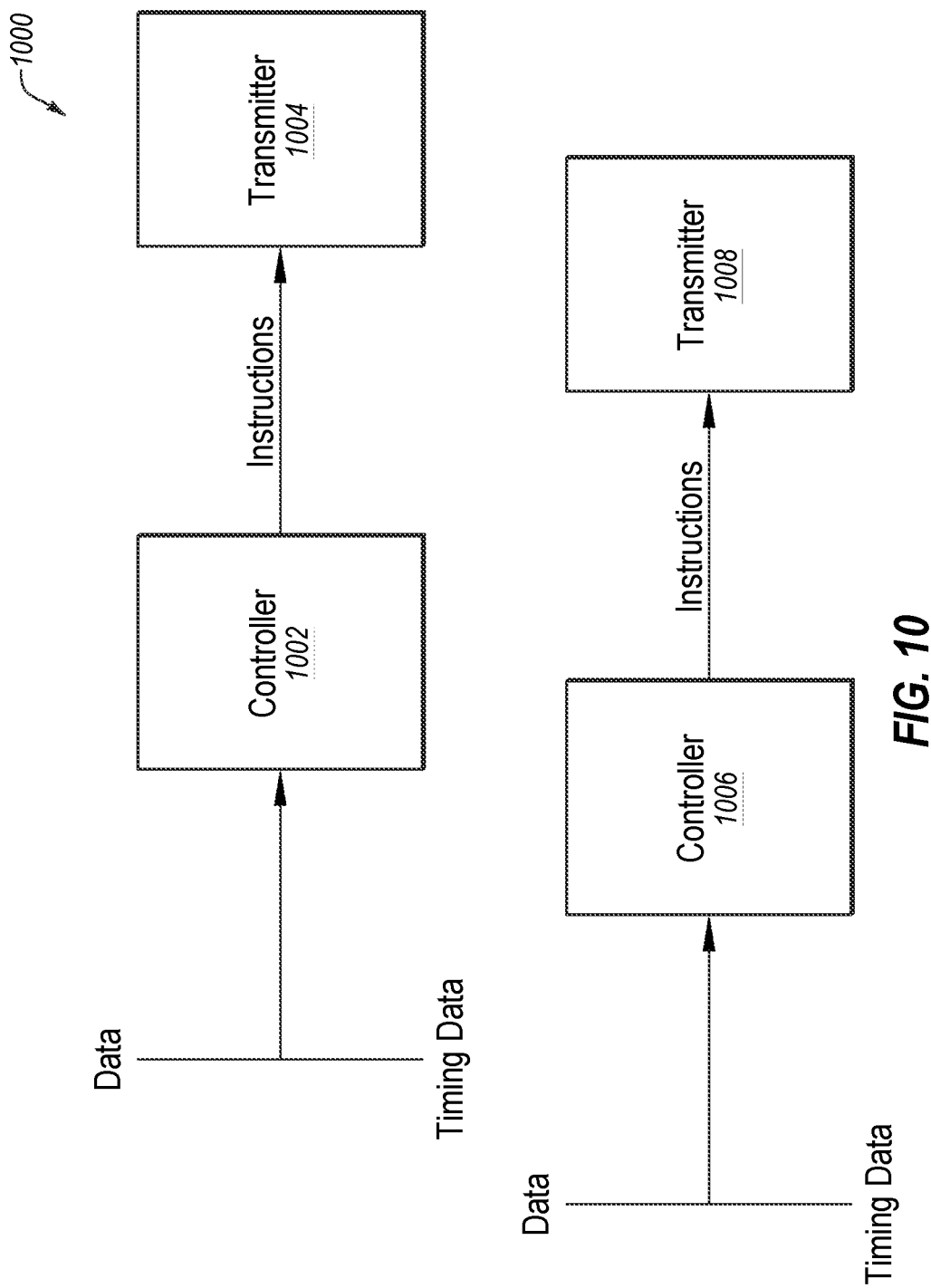
FIG. 10 is a functional block diagram that illustrates logical blocks of a system to perform one or more disclosed techniques when generating radio frequency groundwaves for pulses, according to one or more examples.

FIG. 10 is a functional block diagram that illustrates an example of a system 1000 configured to perform one or more disclosed techniques when generating radio frequency groundwaves for pulses, according to one or more examples. For example, system 1000 includes controller 1002, transmitter 1004, controller 1006, and transmitter 1008. System 1000 may be configured to transmit signals (e.g., pulses in pulse groups of broadcast cycles) according to one or more examples. In particular, controller 1002 may provide instructions for transmitter 1004 to transmit signals and controller 1006 may provide instructions for controller 1006 to transmit signals.

Each of controller 1002 and controller 1006 may be the same as, substantially similar to, and/or perform the same operations as controller 902 of FIG. 9. Each of transmitter 1004 and transmitter 1008 may be the same as, substantially similar to, and/or perform the same operations as transmitter 904 of FIG. 4.

In some examples, controller 1002 and transmitter 1004 may be at a first location and controller 1006 and transmitter 1008 may be at a second location remote from the first location. Controller 1002 and transmitter 1004 may be a first transmitter (e.g., TX1 referenced with regard to FIG. 1A) that may generate first signals (e.g., PG1 of TX1 102 and PG2 of TX1 108). Controller 1006 and transmitter 1008 may be a second transmitter (e.g., TX2 referenced with regard to FIG. 1A) that may generate second signals (e.g., PG1 of TX2 104 and PG2 of TX1 108).

In some examples, controller 1002 and transmitter 1004 may be of the same chain as controller 1006 and transmitter 1008. For example, controller 1002 and transmitter 1004 may generate pulses offset according to first emission delay 402 of FIG. 4 and controller 1006 and transmitter 1008 may generate pulses offset according to second emission delay 404.

Figure 11:
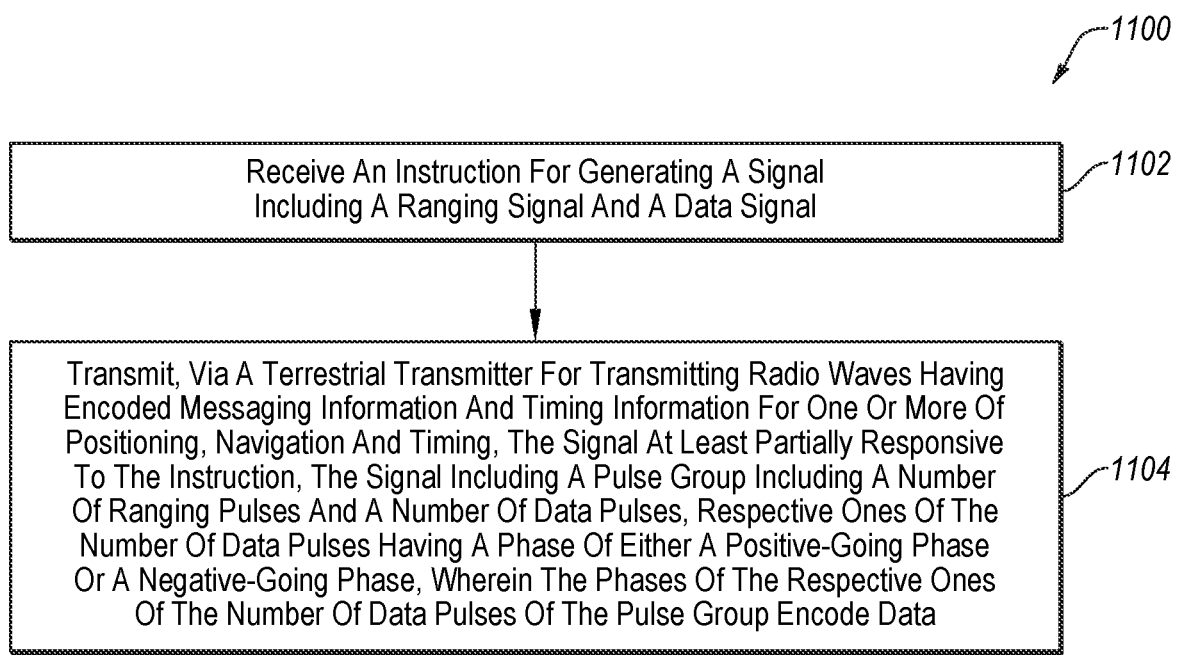
FIG. 11 is a flowchart of a method in accordance with one or more examples.

FIG. 11 is a flowchart of an example method 1100, in accordance with various examples of the disclosure. At least a portion of method 1100 may be performed, in some examples, by a device or system, such as system 900 of FIG. 9, controller 902 of FIG. 9, transmitter 904 of FIG. 9, system 1000 of FIG. 10, controller 1002 of FIG. 10, transmitter 1004 of FIG. 10, controller 1006 of FIG. 10, transmitter 1008 of FIG. 10, or another device or system. Although illustrated as discrete blocks, various blocks may be divided into additional blocks, combined into fewer blocks, or eliminated, depending on the desired implementation.

At block 1102 instruction for generating a signal including a ranging signal and a data signal may be received. For example, transmitter 904 may receive instructions from controller 902.

At block 1104, a signal may be transmitted. The signal may be transmitted via a terrestrial transmitter for transmitting radio waves having encoded messaging information and timing information for one or more of positioning, navigation and timing. The signal may be at least partially responsive to the instruction. The signal may include a pulse group including a number of ranging pulses and a number of data pulses. Respective ones of the number of data pulses may have a phase of either a positive-going phase or a negative-going phase. The phases of the respective ones of the number of data pulses of the pulse group may encode data. For example, the signal may be transmitted by transmitter 904.

Figure 12A:
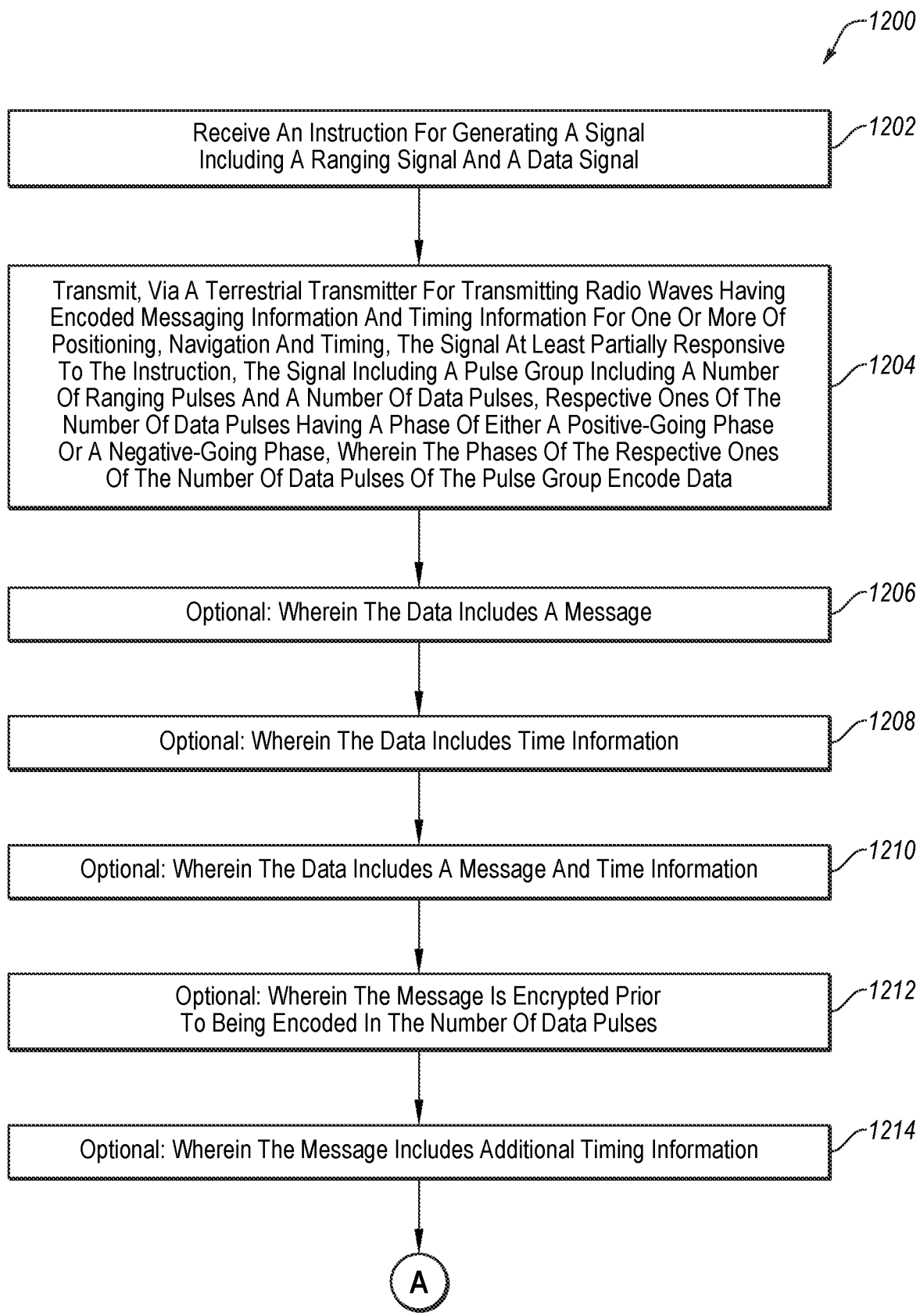
FIGS. 12A and 12B collectively include a flowchart of a method in accordance with one or more examples.
Figure 12B:
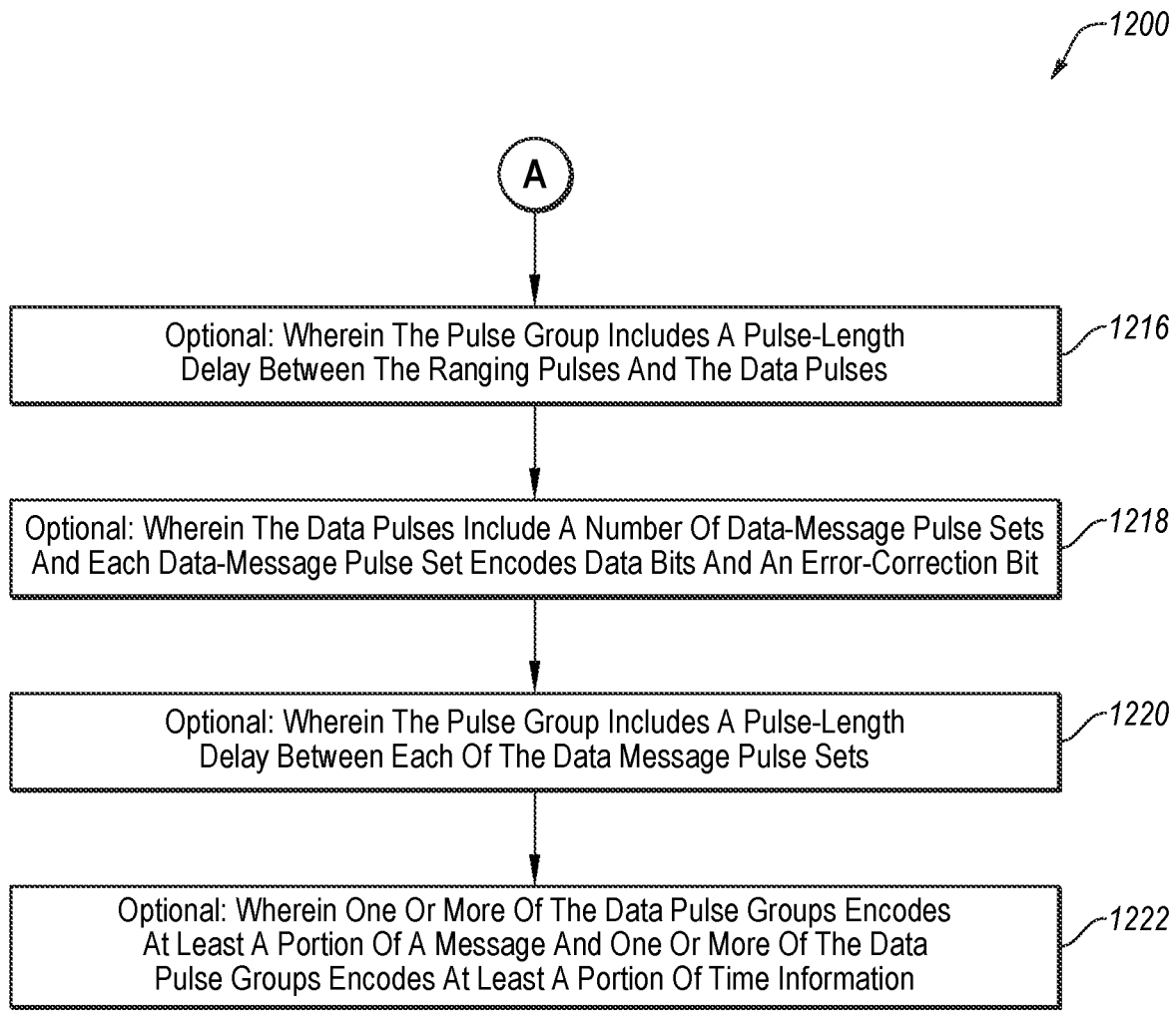

FIGS. 12A and 12B collectively include a flowchart of an example method 1200, in accordance with various examples of the disclosure. At least a portion of method 1200 may be performed, in some examples, by a device or system, such as system 900 of FIG. 9, controller 902 of FIG. 9, transmitter 904 of FIG. 9, system 1000 of FIG. 10, controller 1002 of FIG. 10, transmitter 1004 of FIG. 10, controller 1006 of FIG. 10, transmitter 1008 of FIG. 10, or another device or system. Although illustrated as discrete blocks, various blocks may be divided into additional blocks, combined into fewer blocks, or eliminated, depending on the desired implementation.

Block 1202 may be the same as block 1102 of FIG. 11. Block 1204 may be the same as block 1104 of FIG. 11.

According to block 1206, which is optional, the data may include a message.

According to block 1208, which is optional, the data may include time information.

According to block 1210, which is optional, the data may include both a message and time information.

According to block 1212, which is optional, the message (e.g., the message of block 1206) may be encrypted prior to being encoded in the number of data pulses.

According to block 1214, which is optional, the message (e.g., the message of block 1206) may include additional time information.

According to block 1216, which is optional, the pulse group may include a pulse-length delay between the ranging pulses and the data pulses.

According to block 1218, which is optional, the data pulses may include a number of data-message pulse sets and each data-message pulse sets may encode data bits and an error-correction bit.

According to block 1220, which is optional, the pulse group includes a pulse-length delay between each of the data message pulse sets.

According to block 1222, which is optional, one or more of the data pulse groups encodes at least a portion of a message and one or more of the data pulse groups encodes at least a portion of time information.

Figure 13:
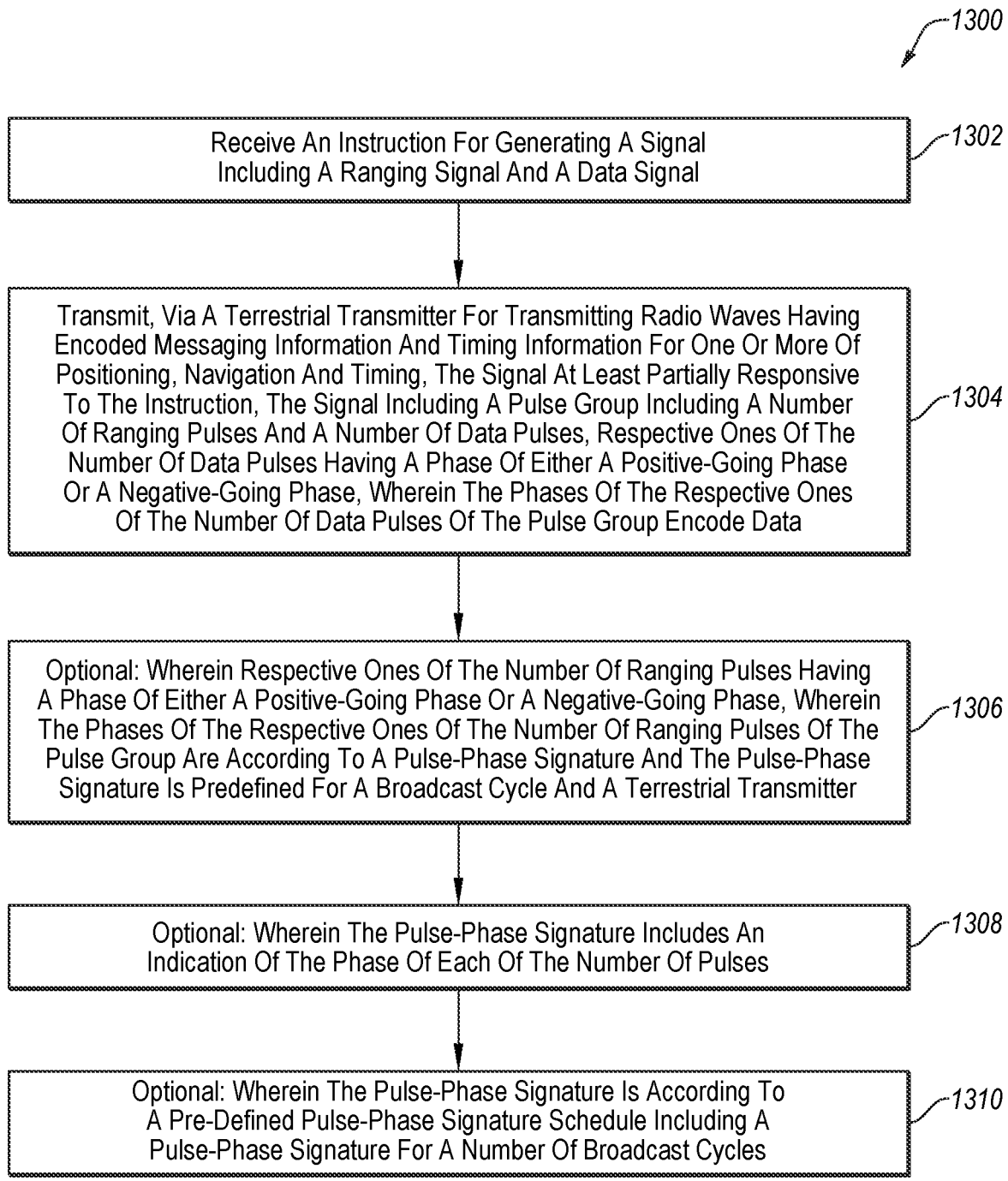
FIG. 13 is a flowchart of a method in accordance with one or more examples.

FIG. 13 is a flowchart of an example method 1300, in accordance with various examples of the disclosure. At least a portion of method 1300 may be performed, in some examples, by a device or system, such as system 900 of FIG. 9, controller 902 of FIG. 9, transmitter 904 of FIG. 9, system 1000 of FIG. 10, controller 1002 of FIG. 10, transmitter 1004 of FIG. 10, controller 1006 of FIG. 10, transmitter 1008 of FIG. 10, or another device or system. Although illustrated as discrete blocks, various blocks may be divided into additional blocks, combined into fewer blocks, or eliminated, depending on the desired implementation.

Block 1302 may be the same as block 1102 of FIG. 11. For example, transmitter 1004 may receive instructions from controller 1002. Block 1304 may be the same as block 1104 of FIG. 11.

According to block 1306, which is optional, respective ones of the number of ranging pulses may have a phase of either a positive-going phase or a negative-going phase. Further, the phases of the respective ones of the number of ranging pulses of the pulse group may be according to a pulse-phase signature. Further, the pulse-phase signature may be predefined for a broadcast cycle and a terrestrial transmitter.

According to block 1308, which is optional, the pulse-phase signature includes an indication of the phase of each of the number of pulses.

According to block 1310, which is optional, the pulse-phase signature may be according to a pre-defined pulse-phase-signature schedule including a pulse-phase signature for a number of broadcast cycles.

Figure 14:
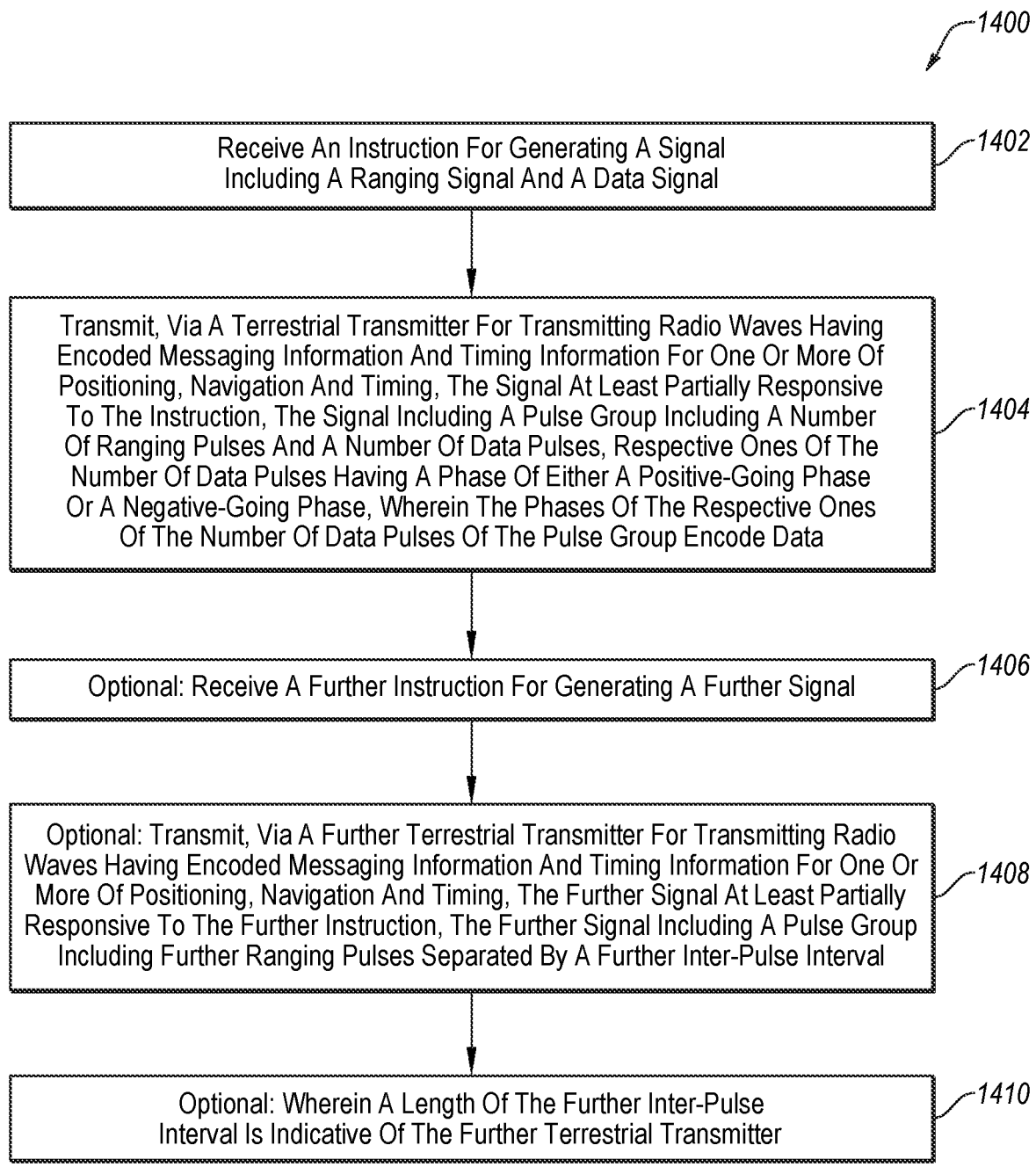
FIG. 14 is a flowchart of a method in accordance with one or more examples.

FIG. 14 is a flowchart of an example method 1400, in accordance with various examples of the disclosure. At least a portion of method 1400 may be performed, in some examples, by a device or system, such as system 900 of FIG. 9, controller 902 of FIG. 9, transmitter 904 of FIG. 9, system 1000 of FIG. 10, controller 1002 of FIG. 10, transmitter 1004 of FIG. 10, controller 1006 of FIG. 10, transmitter 1008 of FIG. 10, or another device or system. Although illustrated as discrete blocks, various blocks may be divided into additional blocks, combined into fewer blocks, or eliminated, depending on the desired implementation.

Block 1402 may be the same as block 1102 of FIG. 11. Block 1404 may be the same as block 1104 of FIG. 11.

At block 1406, which is optional, a further instruction for generating a further signal may be received. For example, transmitter 1008 may receive instructions from controller 1006.

At block 1408, which is optional, a further signal may be transmitted. The further signal may be transmitted via a further terrestrial transmitter for transmitting radio waves having encoded messaging information and timing information for one or more of positioning, navigation and timing. The further signal may be at least partially responsive to the further instruction. The further signal may include a pulse group including further ranging pulses separated by a further inter-pulse interval. For example, the transmitter 1008 may transmit the further signal.

According to block 1410, which is optional, a length of the further inter-pulse interval is indicative of the further terrestrial transmitter.

Figure 15:
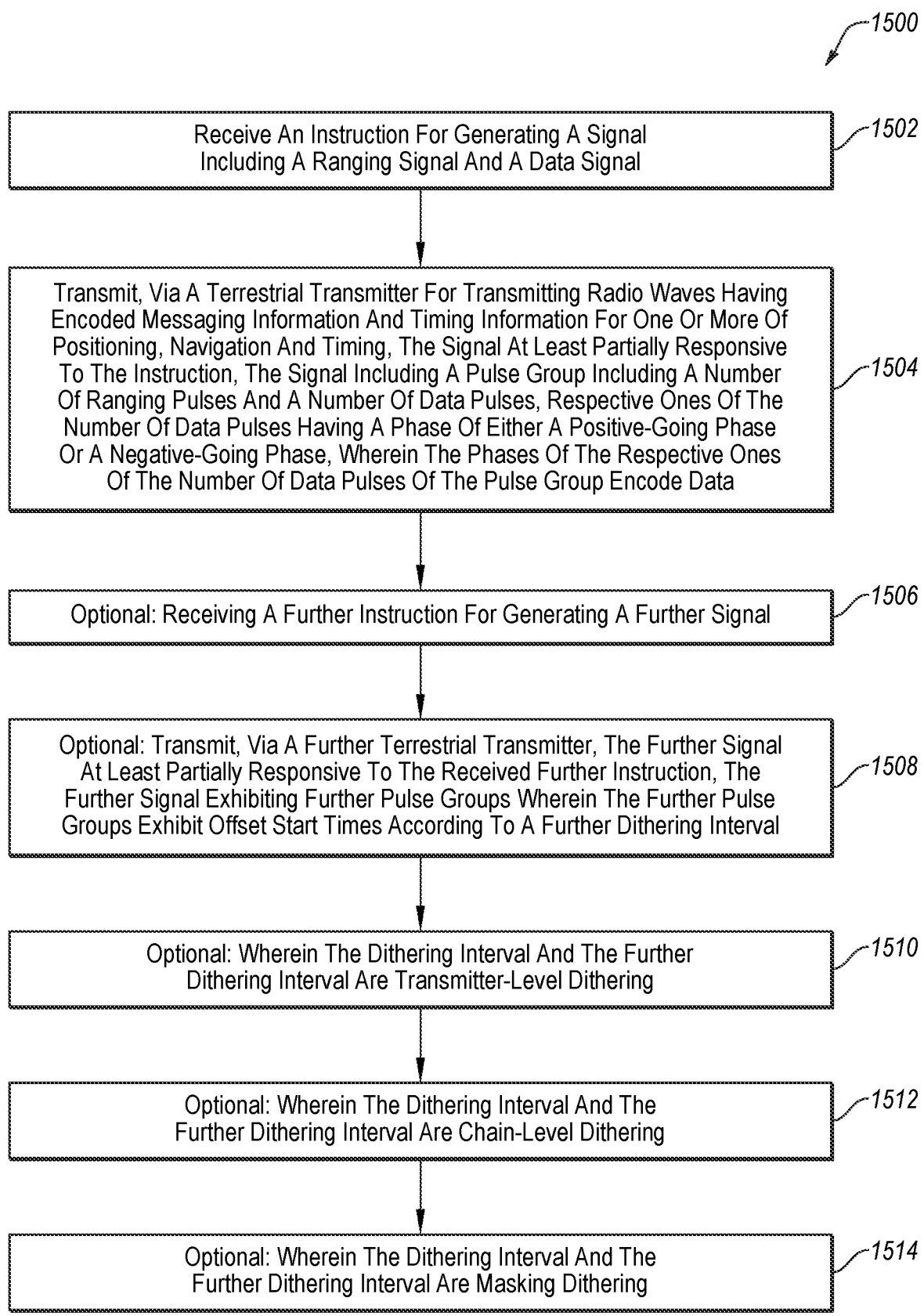
FIG. 15 is a flowchart of a method in accordance with one or more examples.

FIG. 15 is a flowchart of an example method 1500, in accordance with various examples of the disclosure. At least a portion of method 1500 may be performed, in some examples, by a device or system, such as system 900 of FIG. 9, controller 902 of FIG. 9, transmitter 904 of FIG. 9, system 1000 of FIG. 10, controller 1002 of FIG. 10, transmitter 1004 of FIG. 10, controller 1006 of FIG. 10, transmitter 1008 of FIG. 10, or another device or system. Although illustrated as discrete blocks, various blocks may be divided into additional blocks, combined into fewer blocks, or eliminated, depending on the desired implementation.

Block 1502 may be the same as block 1102 of FIG. 11. Block 1504 may be the same as block 1104 of FIG. 11.

At block 1506, which is optional, a further instruction for generating a further signal may be received. For example, transmitter 1008 may receive instructions from controller 1006.

At block 1508, which is optional, a further signal may be transmitted. The further signal may be transmitted via a further terrestrial transmitter. The further signal may be at least partially responsive to the received further instruction. The further signal may exhibit further pulse groups wherein the further pulse groups exhibit offset start times according to a further dithering interval. For example, the transmitter 1008 may transmit the further signal.

According to block 1510, which is optional, the dithering interval and the further dithering interval may be transmitter-level dithering.

According to block 1512, which is optional, the dithering interval and the further dithering interval may be chain-level dithering.

According to block 1514, which is optional, the dithering interval and the further dithering interval may be masking dithering.

Modifications, additions, or omissions may be made to any of method 1100, method 1200, method 1300, method 1400, and method 1500 without departing from the scope of the present disclosure. For example, the operations of any of method 1100, method 1200, method 1300, method 1400, and method 1500 may be implemented in differing order. Furthermore, the outlined operations and actions are only provided as examples, and some of the operations and actions may be optional, combined into fewer operations and actions, or expanded.

Figure 16:
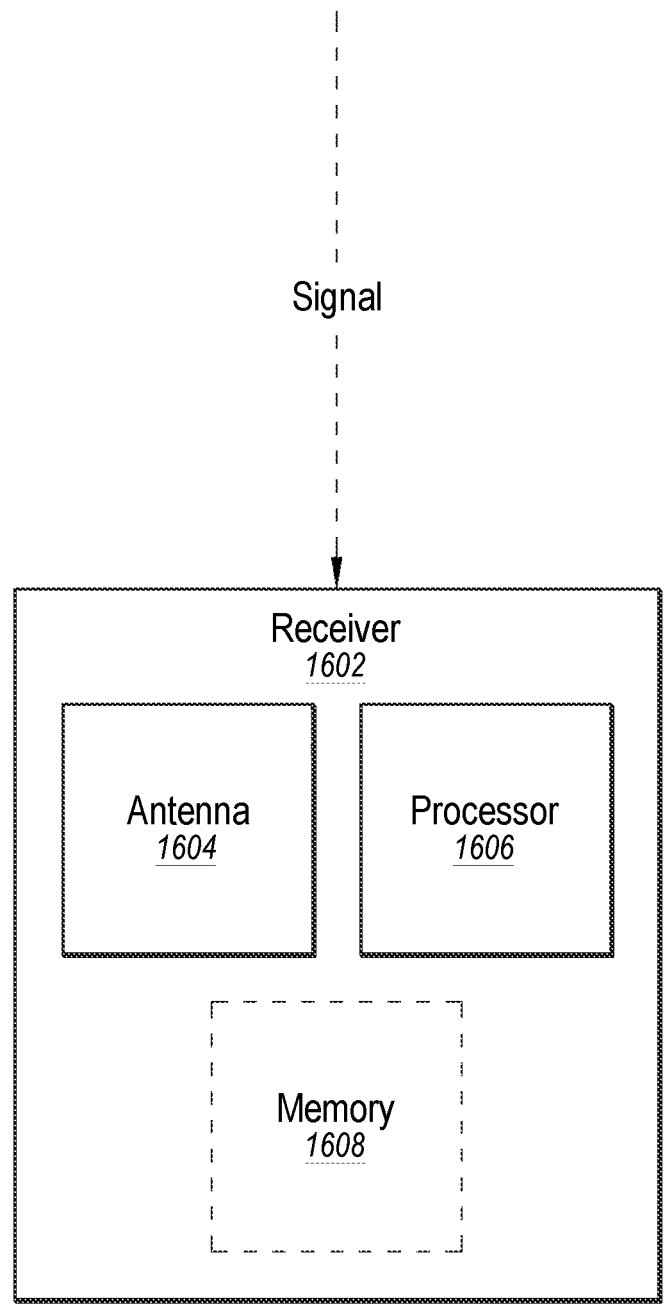
FIG. 16 is a functional block diagram that illustrates a receiver according to one or more examples.

FIG. 16 is a functional block diagram that illustrates a receiver 1602 according to one or more examples. Receiver 1602 includes an antenna 1604 and a processor 1606. Receiver 1602 may include a memory 1608. Memory 1608 is optional in receiver 1602. The optionality of memory 1608 is illustrated by memory 1608 being illustrated using dashed lines. Receiver 1602 may determine PNT information of receiver 1602 based on received signals (e.g., signals transmitted according to any of the examples described herein). Additionally or alternatively, receiver 1602 may decode data encoded in the received signals.

As an example, processor 1606 of receiver 1602 may determine timing information based on one or more pulses of a received signal. For example, receiver 1602 may detect and interpret a zero crossing of a pulse as an indication of a timing event, e.g., for positioning, navigation, and/or timing for a positioning technique (including, as non-limiting examples, multilateration or hyperbolic position estimation calculations). Processor 1606 may determine the position information based on a subset of pulses received, e.g., processor 1606 may determine the timing information based on ranging pulses, e.g., as identified according to a pulse-ordering scheme 200 of FIG. 2.

Processor 1606 may decode one or more symbols of one or more pulses. For example, processor 1606 may decode phase of one or more pulses (e.g., data pulses and/or timing pulses) into data symbols. For example, processor 1606 may observe phases of one or more pulses of a pulse group (e.g., the data pulses and/or the timing pulses, without limitation). Processor 1606 may compare the observed phases of the one or more pulses to entries in a table (stored in memory 1608 and/or securely accessible to receiver 1602, e.g., over a secured link). The table may correlate phases with data symbols.

As a non-limiting example, antenna 1604 may receive a signal encoding timing information for one or more of positioning, navigation, and timing. The signal may include a pulse group comprising a number of ranging pulses and a number of data pulses subsequent to the number of ranging pulses. Respective ones of the number of data pulses may have a phase of either a positive-going phase or a negative-going phase. Data may be encoded using the either positive-going phases or negative-going phases of the data pulses. Processor 1606 may decode the data at least partially responsive to the phases of the respective ones of the number of data pulses.

As a non-limiting example, antenna 1604 may receive a signal encoding timing information for one or more of positioning, navigation, and timing. The signal may include a pulse group comprising a number of ranging pulses and a number of data pulses. Respective ones of the number of data pulses may have a phase of either a positive-going phase or a negative-going phase. Processor 1606 may observe phases of the respective ones of the number of data pulses. Processor 1606 may obtain data at least partially responsive to the phases of the respective ones of the number of data pulses.

Processor 1606 may identify and/or validate a transmitter of the received signal based on the received signal. For example, processor 1606 may measure one or more inter-pulse intervals (e.g., nominal inter-pulse intervals) (e.g., inter-pulse interval 128 of FIG. 1B) of the signal and compare the measured one or more inter-pulse intervals to a list relating values of inter-pulse intervals to transmitter identifiers, which list may be stored in memory 1608 at receiver 1602 and/or securely accessible to receiver 1602, e.g., retrieved by receiver 1602 over a secure link. Processor 1606 may identify or verify a transmitter that transmitted the signal based on a match between a value of the inter-pulse interval of the signal and a value of an inter-pulse interval in the list.

As a non-limiting example, antenna 1604 may receive a ranging signal encoding timing information for one or more of positioning, navigation, and timing. The ranging signal may include a first pulse of a pulse group, a second pulse of the pulse group, and an inter-pulse interval between a start of the first pulse and a start of the second pulse. Processor 1606 may identify a transmitter of the ranging signal at least partially responsive to the inter-pulse interval. Memory 1608 may store a correlation between the inter-pulse interval and the transmitter. Processor 1606 may identify the transmitter responsive to the correlation.

Additionally or alternatively, receiver 1602 may possess (e.g., stored at memory 1608 of receiver 1602, without limitation) a pulse-ordering-scheme definition, e.g., according to pulse-ordering scheme 200 of FIG. 2. Additionally or alternatively, the pulse-ordering-scheme definition may be securely accessible to receiver 1602, e.g., retrieved by receiver 1602 over a secure link. Using the pulse-ordering-scheme, receiver 1602 may determine which pulses of a pulse group are ranging pulses, which are time-message pulses, and which are data-message pulses according to the pulse-ordering scheme.

Receiver 1602 may possess an encryption key (e.g., stored in memory 1608, without limitation) and may utilize the encryption key to decrypt data that was encrypted in data pulses and/or timing pulses. Decrypting timing information in timing pulses may give receiver 1602 access to additional timing information that receiver 1602 may use to increase accuracy of determined position information. Additionally or alternatively, the encryption key may be securely accessible to receiver 1602, e.g., retrieved by receiver 1602 over a secure link.

As a non-limiting example, antenna 1604 may receive a ranging signal encoding messaging information and timing information for one or more of positioning, navigation, and timing. The ranging signal may include a pulse group comprising a number of pulses, wherein first pulses of the number of pulses encode a first type of data and second pulses of the number of pulses encode a second type of data. Processor 1606 may identify the first pulses and the second pulses at least partially responsive to an order of the first pulses and the second pulses in the pulse group and a pre-specified pulse-ordering scheme. Memory 1608 may store the pre-specified pulse-ordering scheme.

Receiver 1602 may possess a dithering schedule (e.g., stored in memory 1608, without limitation). Additionally or alternatively, the dithering schedule may be securely accessible to receiver 1602, e.g., retrieved by receiver 1602 over a secure link. Using the dithering schedule, receiver 1602 may correct for the effects of dithering on the received signals. By correcting for the effects of dithering, receiver 1602 may increase accuracy of calculated positioning, navigation, or timing information. Receiver 1602 may correct for the effects of chain-level dithering, transmitter-level dithering, and/or masking dithering, e.g., chain-level dithering, transmitter-level dithering, and/or masking dithering as described with regard to FIGS. 3-7.

As a non-limiting example, antenna 1604 may receive a ranging signal encoding timing information for one or more of positioning, navigation, and timing. The ranging signal may include a pulse group, the pulse group delayed from a nominal-pulse-group-start time by a dithering interval. Processor 1606 may calculate a time of transmission of the pulse group. Processor 1606 may adjust the calculated time of transmission to account for the dithering interval. Memory 1608 may store a dithering schedule and processor 1606 may determine the dithering interval at least partially responsive to the dithering schedule.

As an example, receiver 1602 may identify or verify a transmitter of a signal based, at least in part, on a pulse-phase signature of one or more pulses of a pulse group. For example, receiver 1602 may determine a phase of one or more pulses (e.g., ranging pulses) of a pulse group. Receiver 1602 may compare the determined phases of the pulses to a pulse-phase-signature schedule, which pulse-phase-signature schedule may be stored in memory 1608 at receiver 1602 and/or securely accessible to receiver 1602, e.g., retrieved by receiver 1602 over a secure link. Receiver 1602 may identify a transmitter that transmitted the signal based on a match between the measured phases of the pulses and pulse-phase signature in the pulse-phase-signature schedule. In such examples, the signal may have been transmitted according to the description above with regard to FIGS. 8A-8C.

As a non-limiting example, antenna 1604 may receive a ranging signal encoding timing information for one or more of positioning, navigation, and timing. The ranging signal may include a pulse group including a number of ranging pulses and a number of data pulses, each of the number of ranging pulses exhibiting either a positive-going phase or a negative-going phase. Processor 1606 may validate a transmitter of the ranging signal by comparing phases of the number of ranging pulses with a pulse-phase signature of the transmitter. Memory 1608 may store the pulse-phase signature.

Figure 17:
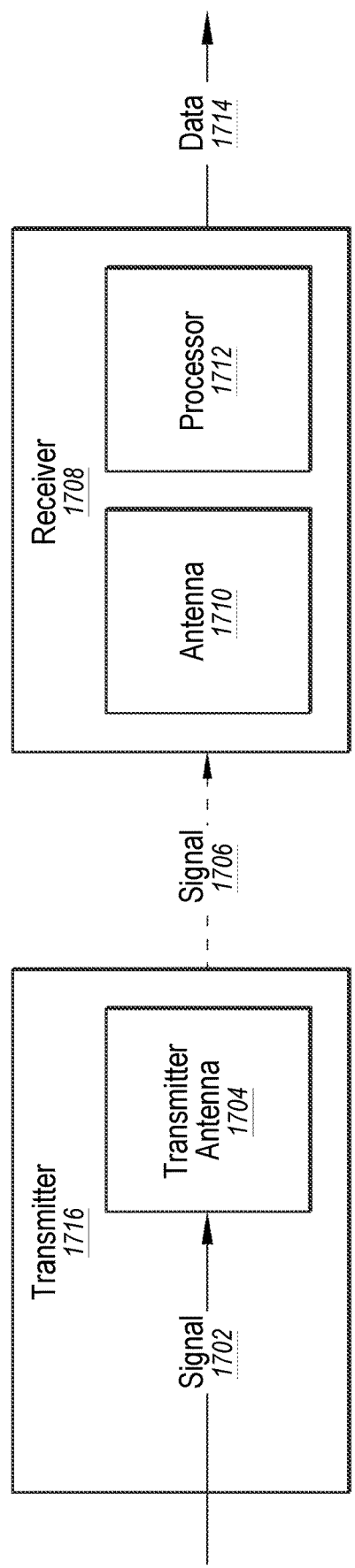
FIG. 17 is a functional block diagram illustrating a system including a transmitter and a receiver according to one or more examples.

FIG. 17 is a functional block diagram illustrating a system including a transmitter 1716 and a receiver 1708 according to one or more examples. Transmitter 1716 may be an example of any of transmitter 904 of FIG. 9, transmitter 1004 of FIG. 10, and transmitter 1008 of FIG. 10. Receiver 1708 may be an example of receiver 1602 of FIG. 16.

As a non-limiting example, a signal 1702 may be a ranging signal to be transmitted at a transmitter antenna 1704 of a transmitter 1716. A signal 1706 may be the ranging signal, having been transmitted as a radio-frequency transmission, at transmitter antenna 1704. Signal 1706 may be received at an antenna 1710 of a receiver 1708. Receiver 1708, using a processor 1712, may generate data 1714 based on signal 1706. Data 1714 may include position, navigation, and/or timing information. Data 1714 may further include a message.

Figure 18:
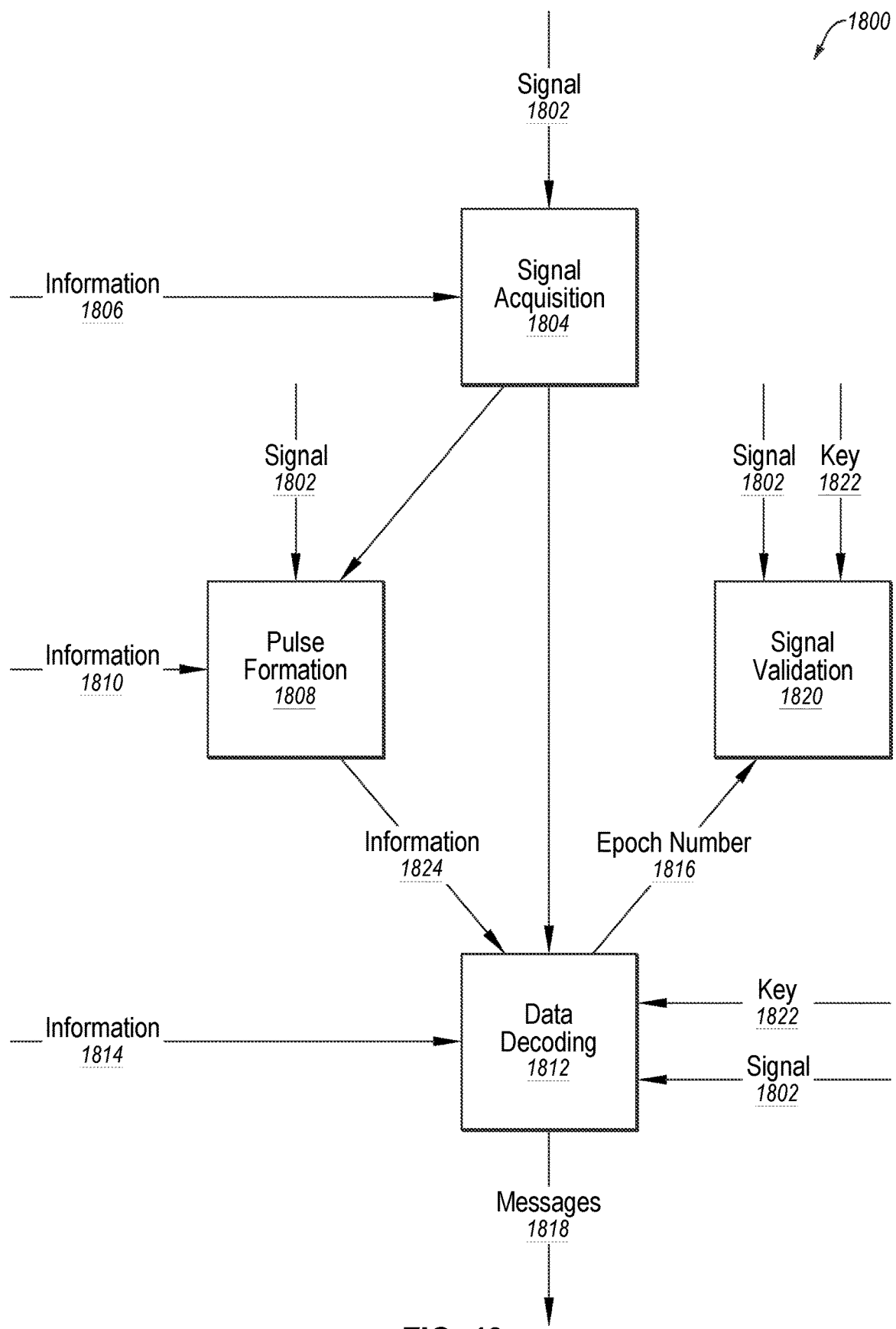
FIG. 18 is a functional block diagram illustrating one or more operations that may occur at a receiver according to one or more examples.

FIG. 18 is a functional block diagram illustrating one or more operations 1800 that may occur at a receiver according to one or more examples. Operations 1800 may occur at and/or be performed by receiver 1602 of FIG. 16, and/or receiver 1708 of FIG. 17. Operations 1800 may be part of an acquisition phase of operations of a receiver.

Signal 1802 may be a received signal including one or more blocks of data at one or more respective times. As a non-limiting example, signal 1802 may be a ranging signal including one or more pulses or pulse groups of one or more epochs. Signal 1802 may be an example of signal 1706 of FIG. 17 as received at receiver 1708 of FIG. 17.

At signal acquisition 1804, signal 1802 may be acquired using a matched filter. As a non-limiting example, received signals at one or more frequencies may be compared to predetermined patterns of one or more matched filters to acquire digital samples representative of signal 1802. At signal acquisition 1804 a start time of an epoch may be determined. Further, because a duration of an epoch may be known, at signal acquisition 1804, a nominal start time of following epochs may also be determined. The epoch start time may be provided to pulse formation 1808 and/or data decoding 1812 either directly from signal acquisition 1804 or the epoch start time may be included in information 1810 and/or information 1814.

Information 1806, provided to signal acquisition 1804, may be, or may include, information used to acquire the signal at signal acquisition 1804. Information 1806 may include one or more signal replicas, e.g., replicas of a portion of signal 1802 less unknown data (e.g., a message encoded by the signal and/or noise). The signal replicas may include replicas of one or more pulses and/or one or more pulse groups. In some examples, the signal replicas may include an epoch's worth of pulses. The signal replicas may be pre-calculated for the receiver to use to correlate with signal 1802 in order to acquire signal 1802. The signal replicas may be based at least in part on an inter-pulse interval, which inter-pulse interval may be unique with regard to a transmitter (e.g., as described with regard to FIG. 1B). The inter-pulse interval may also be unique to the signal being acquired. Additionally or alternatively, the signal replica may be based at least in part on an unencrypted pulse-phase signature (e.g., as described with regard to FIG. 8A, FIG. 8B, and FIG. 8C). The pulse-phase signature may also be unique to the signal being acquired.

At pulse formation 1808, a composite pulse may be formed. The composite pulse may be based on an average of two or more pulses. For example, in some situations, because of noise or other variances, it may be difficult or inaccurate to calculate a time of arrival of a pulse based on a single pulse. Thus, averaging several pulses to form a composite pulse may allow for more accurate calculation of a time of arrival of the composite pulse. With regard to the pulses described with regard to FIG. 1C and FIG. 1D averaging may include averaging a leading edge of multiple pulses. The averaging interval may be selected based on platform dynamics (e.g., the motion of a platform of the receiver). The two or more pulses to be averaged may be selected to be pulses that are not subject to an encoding delay. For example, according to a pulse-ordering scheme (e.g., pulse-ordering scheme 200 of FIG. 2), ranging pulses, that are not delayed by an encoding delay, may be selected to be averaged at pulse formation 1808.

At pulse formation 1808, the one or more pulses formed at pulse formation 1808 may be analyzed. As a non-limiting example, a pulse envelope (e.g., pulse envelope 144 of FIG. 1C) may be identified. Additionally or alternatively, phase tracking points (e.g., points in the pulse at which a phase of the pulse may be determined) may be identified. Additionally or alternatively, at pulse formation 1808, a time of arrival of one of more of the pulses may be determined. Information 1824 may include one or more pieces of information regarding one or more pulses, e.g., including the composite pulses formed at pulse formation 1808. Information 1824 may include, for example, start times of pulses (e.g., start times of ranging pulses) and/or inter-pulse intervals (e.g., nominal inter-pulse intervals). Pulse formation 1808 may provide information 1824 to data decoding 1812.

Information 1810 may be, or may include, information used to form the composite pulses at pulse formation 1808. Information 1810 may include epoch start times. Epoch start times may be, or may include, an index into a data vector. The data vector may relate to time.

At data decoding 1812, an epoch number 1816 and messages 1818 (including, e.g., time messages, and/or data messages) may be decoded from the signal 1802. As a non-limiting example, phases of pulses (e.g., as described with regard to FIG. 1C and FIG. 1D) (e.g., ranging pulses) may be identified phases of multiple pulses may be decoded into data. For example, the phases of a set of pulses may be translated into a data symbol by comparing the phases of the set of pulses to entries in a table correlating pulse phases to data symbols.

Additionally or alternatively, according to a nominal inter-pulse interval, unique inter-pulse intervals (e.g., as described with regard to FIG. 1B), and/or a nominal group repetition interval, pulse groups and/or individual pulses may be identified within the acquired signal. As a non-limiting example, start and/or end times (e.g., as illustrated by FIG. 1C and/or FIG. 1D) of individual pulses may be identified. Based on the start and/or end times, the acquired signal may be parsed into pulses.

According to a pulse-ordering scheme (e.g., pulse-ordering scheme 200 of FIG. 2), template pulses, data pulses, and/or timing pulses may be identified from among the received pulses. According to a pulse-phase signature (e.g., as described with regard to FIG. 8A, FIG. 8B, and FIG. 8C) phases of each ranging pulse may be corrected (e.g., phase codes may be wiped from the pulses). The data pulses and/or timing pulses may be identified such that data (encoded as phases of the data and/or timing pulses) may be decoded.

The determined symbols or bits of data decoded at data decoding 1812 may be input into an error-correction algorithm, e.g., a Reed Solomon Forward Error Correction (FEC) algorithm, without limitation. If a number of errors is such that the error-correction algorithm is able correct the errors, the error-correction algorithm may return the correct message as messages 1818. If the error-correction algorithm rejects the time message during the acquisition phase, the receiver may not have successfully acquired the signal (e.g., at signal acquisition 1804). If the receiver did not successfully acquire the signal, subsequent data blocks of the signal may be acquired and the process may begin again.

One or more time-message pulses may be decoded into symbols and time-message bits. If the error-correction algorithm determines that the message does not have errors, or the error-correction algorithm determines has corrected the errors, the time-message bits may be parsed into an epoch number 1816 to be forwarded to signal validation 1820 and/or other associated time data.

At data decoding 1812, the epoch number 1816 may be combined with a cryptographic key 1822 (alternatively referred to herein as "key 1822") to decrypt the data message. The data message may be parsed into information, such as but not limited to, differential corrections and/or a data message.

Information 1814 may include information used at data decoding 1812 to decode data from the acquired signal. Information 1814 may include a cryptographic key (e.g., used to decode the data message at data decoding 1812). Additionally or alternatively, information 1814 may include the pulse-ordering scheme. Additionally or alternatively, information 1814 may include the epoch start time.

At signal validation 1820, signal 1802 may be validated, e.g., based on a correspondence between phases of pulses of signal 1802 and a pulse-phase signature. In some examples signal validation 1820 may provide phase codes and/or epoch start time to pulse formation 1808.

As a non-limiting example, epoch number 1816 and key 1822 may be inputs to signal validation 1820. At signal validation 1820, an index of a look-up table of pulse-phase signatures may be determined (e.g., based at least in part on epoch number 1816). As a non-limiting example, epoch number 1816 and key 1822 may be used as input to a cryptographic algorithm (not shown) that returns an index of a look-up table of pulse-phase signatures. The look-up table may return a pulse-phase signature (responsive to epoch number 1816 and key 1822). If the phases of signal 1802 match the pulse-phase signature, signal 1802 may be validated.

In some examples, epoch number 1816, having been obtained (at data decoding 1812) by decoding a time message during an epoch when the unencrypted pulse-phase signature was transmitted, may be incremented, and used to return the pulse-phase signature of the next epoch of signal 1802. If this sequence was encrypted, the encrypted pulse-phase signature is correlated with the received signal 1802. If the correlation is sufficiently positive (e.g., meets or exceeds a predetermined threshold, without limitation), signal 1802 is authenticated, the receiver has successfully acquired, and transitions to the tracking phase.

Figure 19:
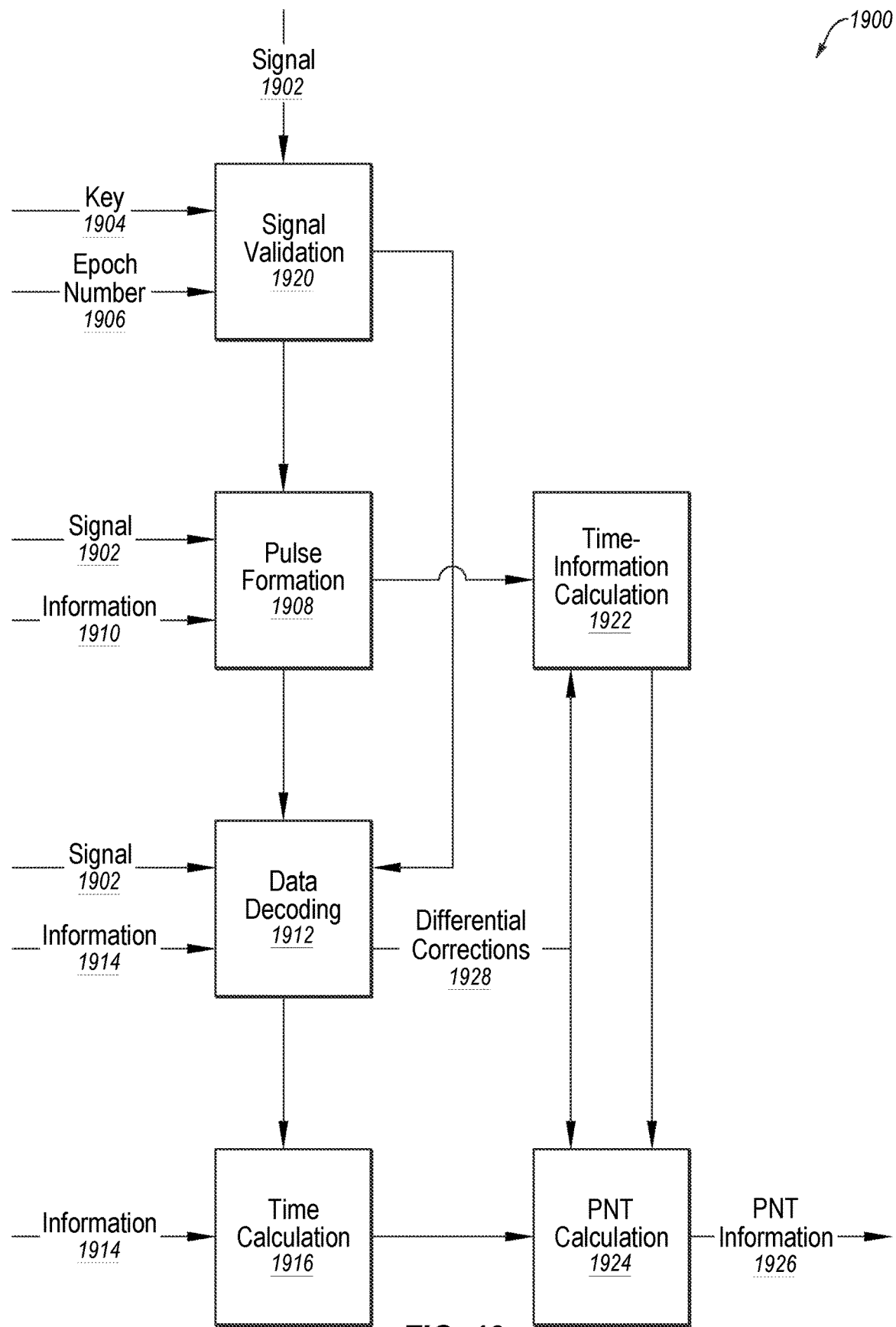
FIG. 19 is a functional block diagram illustrating one or more operations that may occur at a receiver according to one or more examples.

FIG. 19 is a functional block diagram illustrating one or more operations 1900 that may occur at a receiver according to one or more examples. Operations 1900 may occur at and/or be performed by receiver 1602 of FIG. 16, and/or receiver 1708 of FIG. 17. Operations 1900 may be part of a tracking phase of operation of a receiver. Operation 1900 may follow successful completion of one or more of operations 1800.

Signal 1902 may be the same as, or substantially similar to, signal 1802 of FIG. 18. Signal validation 1920 may be the same as, or substantially similar to, signal validation 1820 of FIG. 18, key 1904 may be the same as, or substantially similar to key 1822 of FIG. 18 and epoch number 1906 may be the same as, or substantially similar to epoch number 1816 of FIG. 18.

In addition to the operations described with regard to signal validation 1820, signal validation 1920 may provide phase codes to pulse formation 1908, and/or data decoding 1912. As a non-limiting example, at signal validation 1920, signal validation 1920 may validate signal 1902 at least partially responsive to a match between phases of signal 1902 and a pulse-phase signature of a table of valid pulse-phase signatures. Additionally or alternatively, the pulse-phase signature may be used at data decoding 1912 to wipe off the phase code prior to the demodulation process. Additionally or alternatively, pulse-phase signature may also be used at pulse formation 1908 to wipe off the phase code prior to generating the composite or average pulse.

Pulse formation 1908 may be the same as, or substantially similar to, pulse formation 1808 of FIG. 18. Information 1910 may be the same as, or substantially similar to, information 1810 of FIG. 18. Data decoding 1912 may be the same as, or substantially similar to, data decoding 1812 of FIG. 18. Information 1914 may be the same as, or substantially similar to, information 1814 of FIG. 18. Epoch number 1906, key 1904, and/or an epoch start time may be included in information 1914. In addition to the operations described with regard to data decoding 1812, data decoding 1912 may generate differential corrections 1928. Differential corrections 1928 may be based, at least in part, on a decoded data message.

At time calculation 1916 a nominal time of transmission (TOT) of an epoch (e.g., a current epoch) of signal 1902 may be calculated. The nominal TOT may be the epoch number multiplied by the epoch duration plus the nominal emission delay for the particular station.

Additionally or alternatively, at time calculation 1916, dither may be corrected. As a non-limiting example, at time calculation 1916, dither may be accounted for and/or corrected when determining a TOT of signal 1902 for the relevant epoch. At time calculation 1916, one or more dithering offsets may be determined, e.g., by indexing into a dithering schedule using epoch number 1906 (e.g., as described with regard to FIGS. 3-7). The dithering offsets may be added to, or subtracted from, the TOT to obtain a TOT not distorted by dithering.

At time-information calculation 1922, timing information may be calculated. As a non-limiting example, an offset between a local clock and coordinated universal time (UTC) may be determined. The timing information may be calculated based on signal 1902 (e.g., as analyzed at pulse formation 1908). As a non-limiting example, at time-information calculation 1922, timing information may be calculated at least partially responsive to a time of arrival of one or more of pulses of signal 1902, e.g., as identified at pulse formation 1908. In some cases, the time of arrival of one or more pulses may be refined or updated responsive to a determined offset between the local clock and UTC. Additionally or alternatively, the timing information may be calculated at time-information calculation 1922 based at least in part on differential corrections 1928, which differential corrections 1928 may have been determined at data decoding 1912. As a non-limiting example, at data decoding 1912, timing information may be decoded from time-message pulses. The timing information may include differential corrections. At time-information calculation 1922, the differential corrections may be applied. Additionally or alternatively, the time of transmission, e.g., after the effects of dithering have been corrected (which corrections may have occurred at time calculation 1916) may be used to calculate the timing information at time-information calculation 1922.

At PNT calculation 1924, PNT information 1926 may be calculated. PNT information 1926 may include a position of the receiver, e.g., relative to one or more transmitters. PNT information 1926 may include a latitude and longitude of the receiver. PNT information 1926 may be calculated, at PNT calculation 1924, based at least in part on differences between times of transmissions of signals (including, e.g., signal 1902) from two or more transmitters (which times of transmissions may have been calculated at time calculation 1916) and times of arrivals of the signals (which times of arrivals may have been calculated at pulse formation 1908 and/or which times of arrival may have been adjusted or refined at time-information calculation 1922). The PNT information 1926 may be calculated, at PNT calculation 1924, using a positioning technique (including, as non-limiting examples, multilateration position estimation, or hyperbolic position estimation calculations).

Additionally or alternatively, at PNT calculation 1924, the receiver may be used for monitoring, survey, or timing purposes. For example, the receiver may compare the received time of arrival to a predicted received time according to a standard model. The difference between the received time and the predicted received time can be used for signal monitoring, surveying, and/or for calculating differential correction information.

Figure 20:
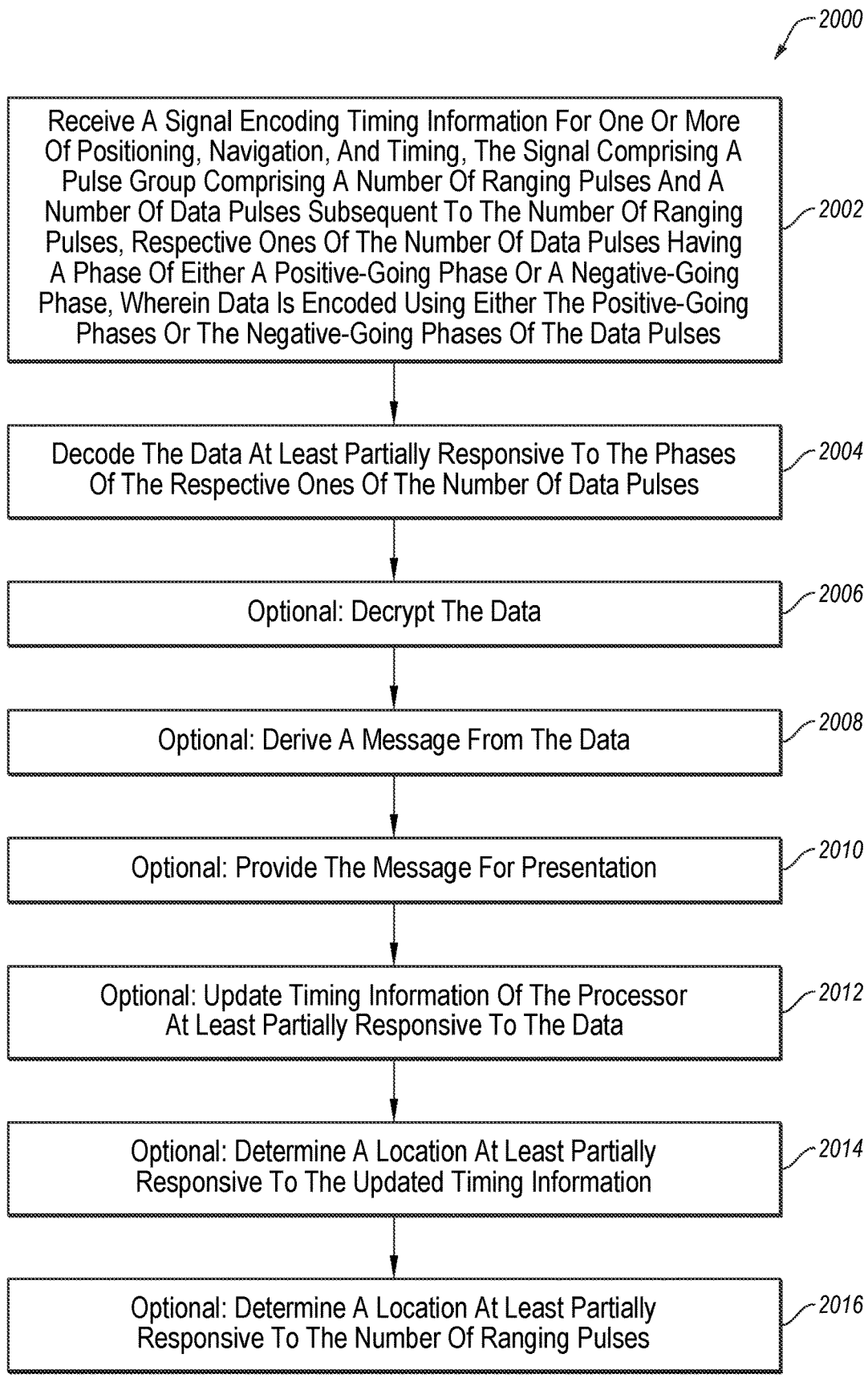
FIG. 20 is a flowchart illustrating a method for receiving radio waves and for decoding data encoded by the radio waves according to one or more examples.

FIG. 20 is a flowchart illustrating a method 2000 for receiving radio waves and for decoding data encoded by the radio waves according to one or more examples. In particular, method 2000 may be for receiving radio waves broadcast by a terrestrial transmitter, the radio waves encoding messaging information and timing information for one or more of positioning, navigation, and timing and for decoding data encoded by a signal of the radio waves. Method 2000 may be performed by a receiver, such as, for example, receiver 1602 of FIG. 16 or receiver 1708 of FIG. 17.

At operation 2002, a signal encoding timing information for one or more of positioning, navigation, and timing may be received. The signal may include a pulse group comprising a number of ranging pulses and a number of data pulses subsequent to the number of ranging pulses. Respective ones of the number of data pulses may have a phase of either a positive-going phase or a negative-going phase. Data may be encoded using the either positive-going phases or negative-going phases of the data pulses. The signal transmitted at operation 1102 of FIG. 11 may be an example of the signal received at 2002.

At operation 2004, the data may be decoded at least partially responsive to the phases of the respective ones of the number of data pulses.

At operation 2006, which is optional, the data (or a portion of the data) may be decrypted.

At operation 2008, which is optional, a message may be derived from the data.

At operation 2010, which is optional, the message may be provide for presentation, e.g., at a screen.

At operation 2012, which is optional, timing information of the processor (or used by the processor) may be updated at least partially responsive to the data. For example, the data may include timing information. The processor may use the timing information to update timing information of the processor or of the receiver.

At operation 2014, which is optional, a location (e.g., of the receiver) may be determined at least partially responsive to the updated timing information. For example, a time of arrival may be calculated based, at least in part, on the updated timing information as updated responsive to the timing information encoded in the signal.

At operation 2016, which is optional, a location (e.g., of the receiver) may be determined at least partially responsive to the number of ranging pulses of the signal.

Figure 21:
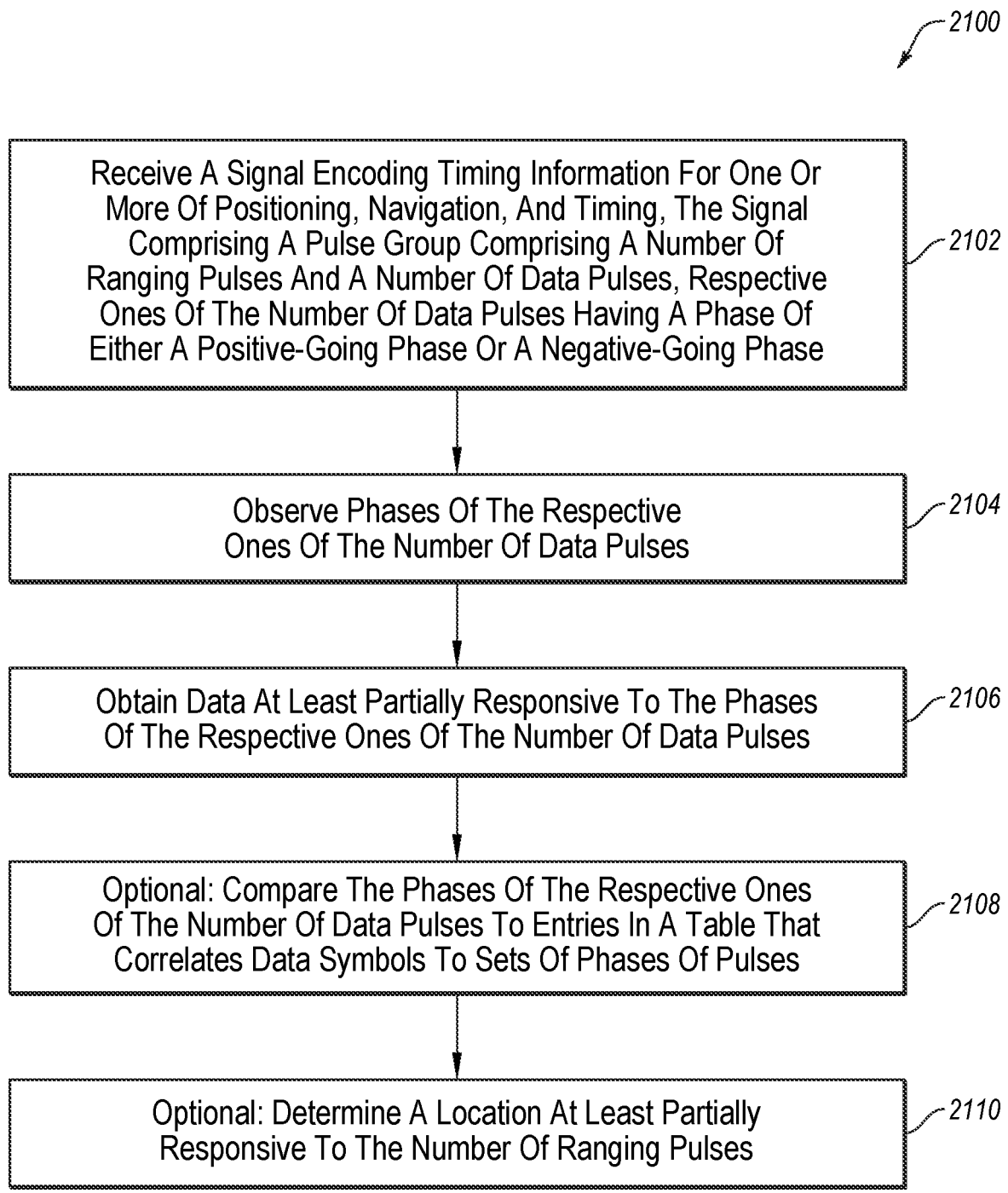
FIG. 21 is a flowchart illustrating a method for receiving radio waves and for decoding data encoded by the radio waves according to one or more examples.

FIG. 21 is a flowchart illustrating a method 2100 for receiving radio waves and for decoding data encoded by the radio waves according to one or more examples. In particular, method 2100 may be for receiving radio waves broadcast by a terrestrial transmitter, the radio waves encoding messaging information and timing information for one or more of positioning, navigation, and timing and for decoding data encoded by a signal of the radio waves. Method 2100 may be performed by a receiver, such as, for example, receiver 1602 of FIG. 16 or receiver 1708 of FIG. 17.

At operation 2102, a signal encoding timing information for one or more of positioning, navigation, and timing may be received. The signal may include a pulse group comprising a number of ranging pulses and a number of data pulses. Respective ones of the number of data pulses may have a phase of either a positive-going phase or a negative-going phase. The signal transmitted at operation 1102 of FIG. 11 may be an example of the signal received at 2102.

At operation 2104, phases of the respective ones of the number of data pulses may be observed. The observations regarding phases may be recorded.

At operation 2106, data may be obtained at least partially responsive to the phases of the respective ones of the number of data pulses.

At operation 2108, which is optional, the phases of the respective ones of the number of data pulses may be compared to entries in a table that correlates data symbols to sets of phases of pulses.

At operation 2110, which is optional, a location (e.g., of the receiver) may be determined at least partially responsive to the number of ranging pulses.

Modifications, additions, or omissions may be made to any of method 2000 of FIG. 20 and/or method 2100 of FIG. 21 without departing from the scope of the present disclosure. For example, the operations of any of method 2000 of FIG. 20 and/or method 2100 of FIG. 21 may be implemented in differing order. Furthermore, the outlined operations and actions are only provided as examples, and some of the operations and actions may be optional, combined into fewer operations and actions, or expanded into additional operations and actions without detracting from the essence of the disclosed example.

As used in the present disclosure, the term "combination" with reference to a plurality of elements may include a combination of all the elements or any of various different subcombinations of some of the elements. For example, the phrase "A, B, C, D, or combinations thereof" may refer to any one of A, B, C, or D; the combination of each of A, B, C, and D; and any subcombination of A, B, C, or D such as A, B, and C; A, B, and D; A, C, and D; B, C, and D; A and B; A and C; A and D; B and C; B and D; or C and D.

Terms used in the present disclosure and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," without limitation). As used herein, "each" means some or a totality. As used herein, "each and every" means a totality.

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to examples containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, without limitation" or "one or more of A, B, and C, without limitation" is used, in general such a construction is intended to include A alone, B alone, C alone, A and B together, A and C together, B and C together, or A, B, and C together, without limitation.

Further, any disjunctive word or phrase presenting two or more alternative terms, whether in the description, claims, or drawings, should be understood to contemplate the possibilities of including one of the terms, either of the terms, or both terms. For example, the phrase "A or B" should be understood to include the possibilities of "A" or "B" or "A and B."

Additional non-limiting examples of the disclosure include:

Example 1: A method, comprising: receiving an instruction for generating a signal comprising a ranging signal and a data signal; and transmitting, via a terrestrial transmitter for transmitting radio waves having encoded messaging information and timing information for one or more of positioning, navigation and timing, the signal at least partially responsive to the instruction, the signal comprising a pulse group comprising a number of ranging pulses and a number of data pulses subsequent to the number of ranging pulses, respective ones of the number of data pulses having a phase of either a positive-going phase or a negative-going phase, wherein data is encoded using the either positive-going phases or negative-going phases of the data pulses.

Example 2: The method according to Example 1, wherein the data comprises a message.

Example 3: The method according to any of Examples 1 and 2, wherein the data comprises time information.

Example 4: The method according to any of Examples 1 through 3, wherein the data comprises a message and time information.

Example 5: The method according to any of Examples 1 through 4, wherein the message is encrypted prior to being encoded in the number of data pulses.

Example 6: The method according to any of Examples 1 through 5, wherein the message includes additional timing information.

Example 7: The method according to any of Examples 1 through 6, wherein the pulse group comprises a pulse-length delay between the number of ranging pulses and the number of data pulses.

Example 8: The method according to any of Examples 1 through 7, wherein the number of data pulses comprises a number of data-message pulse sets and each data-message pulse set encodes data bits and an error-correction bit.

Example 9: The method according to any of Examples 1 through 8, wherein the pulse group comprises a pulse-length delay between each of the number of data-message pulse sets.

Example 10: The method according to any of Examples 1 through 9, wherein one or more of the data-message pulse sets encodes at least a portion of a message and one or more of the data-message pulse sets encodes at least a portion of time information.

Example 11: The method according to any of Examples 1 through 10, wherein respective ones of the number of ranging pulses have a phase of either a positive-going phase or a negative-going phase, wherein the phases of the respective ones of the number of ranging pulses of the pulse group are according to a pulse-phase signature and the pulse-phase signature is predefined for a broadcast cycle and a terrestrial transmitter.

Example 12: The method according to any of Examples 1 through 11, wherein the pulse-phase signature comprises an indication of the phase of each of the number of ranging pulses.

Example 13: The method according to any of Examples 1 through 12, wherein the pulse-phase signature is according to a pre-defined pulse-phase-signature schedule comprising a pulse-phase signature for a number of broadcast cycles.

Example 14: The method according to any of Examples 1 through 13, wherein each of the number of ranging pulses is separated by an inter-pulse interval, a length of the inter-pulse interval indicative of the terrestrial transmitter.

Example 15: The method according to any of Examples 1 through 14, comprising: receiving a further instruction for generating a further signal; and transmitting, via a further terrestrial transmitter for transmitting radio waves having encoded messaging information and timing information for one or more of positioning, navigation and timing, the further signal at least partially responsive to the further instruction, the further signal comprising a pulse group comprising further ranging pulses separated by a further inter-pulse interval.

Example 16: The method according to any of Examples 1 through 15, wherein a length of the further inter-pulse interval is indicative of the further terrestrial transmitter.

Example 17: The method according to any of Examples 1 through 16, wherein transmitting the signal comprises offsetting a start time of the pulse group by a dithering interval.

Example 18: The method according to any of Examples 1 through 17, comprising: receiving a further instruction for generating a further signal; and transmitting, via a further terrestrial transmitter, the further signal at least partially responsive to the received further instruction, the further signal exhibiting further pulse groups wherein the further pulse groups exhibit offset start times according to a further dithering interval.

Example 19: The method according to any of Examples 1 through 18, wherein the dithering interval and the further dithering interval are transmitter-level dithering.

Example 20: The method according to any of Examples 1 through 19, wherein the dithering interval and the further dithering interval are chain-level dithering.

Example 21: The method according to any of Examples 1 through 20, wherein the dithering interval and the further dithering interval comprise masking dithering and a dithering interval according to a ramp.

Example 22: An apparatus, comprising: a controller to: generate an instruction for generating a signal comprising a ranging signal and a data signal, the signal comprising a pulse group comprising a number of ranging pulses and a number of data pulses subsequent to the number of ranging pulses, respective ones of the number of data pulses having a phase of either a positive-going phase or a negative-going phase, wherein information is encoded using the either positive-going phases or negative-going phases of the data pulses; and provide the instruction to a terrestrial transmitter for transmitting radio waves having encoded messaging information and timing information for one or more of positioning, navigation and timing.

Example 23: A device comprising: an antenna to receive a signal encoding timing information for one or more of positioning, navigation, and timing, the signal comprising a pulse group comprising a number of ranging pulses and a number of data pulses subsequent to the number of ranging pulses, respective ones of the number of data pulses having a phase of either a positive-going phase or a negative-going phase, wherein data is encoded using the either positive-going phases or negative-going phases of the data pulses; and a processor to decode the data at least partially responsive to the phases of the respective ones of the number of data pulses.

Example 24: The device according to Example 23, wherein the processor is to decrypt the data.

Example 25: The device according to any of Examples 23 and 24, wherein the processor is to derive a message from the data.

Example 26: The device according to any of Examples 23 through 25, wherein the processor is to provide the message for presentation.

Example 27: The device according to any of Examples 23 through 26, wherein the processor is to update timing information of the processor at least partially responsive to the data.

Example 28: The device according to any of Examples 23 through 27, wherein the processor is to determine a location of the device at least partially responsive to the updated timing information.

Example 29: The device according to any of Examples 23 through 28, wherein the processor is to derive a message from the data and to update timing information of the processor at least partially responsive to the data.

Example 30: The device according to any of Examples 23 through 29, wherein the processor is to decrypt a portion of the data from which the message is derived.

Example 31: The device according to any of Examples 23 through 30, wherein respective ones of the number of ranging pulses have a phase of either a positive-going phase or a negative-going phase, wherein the phases of the respective ones of the number of ranging pulses of the pulse group are according to a pulse-phase signature, and wherein the processor is to validate a transmitter of a ranging signal by comparing phases of the number of ranging pulses with the pulse-phase signature of the transmitter.

Example 32: The device according to any of Examples 23 through 31, wherein the processor is to identify a transmitter of a ranging signal at least partially responsive to an inter-pulse interval, the inter-pulse interval being a duration of a time separation between the number of ranging pulses.

Example 33: The device according to any of Examples 23 through 32, wherein the processor is to: obtain a time of transmission of the pulse group; and adjust the calculated time of transmission to account for a dithering interval.

Example 34: The device according to any of Examples 23 through 33, wherein the processor is to determine a location of the device at least partially responsive to the adjusted time of transmission.

Example 35: The device according to any of Examples 23 through 34, wherein the processor is to determine a location of the device at least partially responsive to the number of ranging pulses.

Example 36: A device comprising: an antenna to receive a signal encoding timing information for one or more of positioning, navigation, and timing, the signal comprising a pulse group comprising a number of ranging pulses and a number of data pulses, respective ones of the number of data pulses having a phase of either a positive-going phase or a negative-going phase; and a processor to: observe phases of the respective ones of the number of data pulses; and obtain data at least partially responsive to the phases of the respective ones of the number of data pulses.

Example 37: The device according to Example 36, wherein the device comprises a memory to store a table that correlates data symbols to sets of phases of pulses; and wherein the processor is to compare the phases of the respective ones of the number of data pulses to entries in the table to obtain the data.

Example 38: The device according to any of Examples 36 and 37, wherein the processor is to determine a location of the device at least partially responsive to the number of ranging pulses.

Example 39: A method comprising: receiving a signal encoding timing information for one or more of positioning, navigation, and timing, the signal comprising a pulse group comprising a number of ranging pulses and a number of data pulses, respective ones of the number of data pulses having a phase of either a positive-going phase or a negative-going phase; observing phases of the respective ones of the number of data pulses; and obtaining data at least partially responsive to the phases of the respective ones of the number of data pulses.

Example 40: The method according to Example 39, comprising comparing the phases of the respective ones of the number of data pulses to entries in a table that correlates data symbols to sets of phases of pulses.

Example 41: The method according to any of Examples 39 and 40, comprising determining a location at least partially responsive to the number of ranging pulses.

While the present disclosure has been described herein with respect to certain illustrated examples, those of ordinary skill in the art will recognize and appreciate that the present invention is not so limited. Rather, many additions, deletions, and modifications to the illustrated and described examples may be made without departing from the scope of the invention as hereinafter claimed along with their legal equivalents. In addition, features from one example may be combined with features of another example while still being encompassed within the scope of the invention as contemplated by the inventors.

What is claimed is:

1. A device comprising:
    an antenna to receive a signal encoding timing information for one or more of positioning, navigation, and timing, the signal comprising a pulse group comprising a number of ranging pulses and a number of data pulses subsequent to the number of ranging pulses, respective ones of the number of data pulses having a phase of either a positive-going phase or a negative-going phase, wherein data is encoded in data symbols correlated to sets of phases of the data pulses;
    a memory to store a table that correlates the data symbols to the sets of phases of data pulses; and
    a processor to:
        observe phases of the respective ones of the number of data pulses;
        decode respective ones of the data symbols at least partially responsive to the observed phases by comparing the observed phases to entries in the table that correlates the data symbols to the sets of phases of data pulses; and
        obtain the data at least partially responsive to the decoded data symbols.

2. The device of claim 1, wherein the processor is to decrypt the data.

3. The device of claim 1, wherein the processor is to derive a message from the data.

4. The device of claim 3, wherein the processor is to provide the message for presentation.

5. The device of claim 1, wherein the processor is to update timing information of the processor at least partially responsive to the data.

6. The device of claim 5, wherein the processor is to determine a location of the device at least partially responsive to the updated timing information.

7. The device of claim 1, wherein the processor is to derive a message from the data and to update timing information of the processor at least partially responsive to the data.

8. The device of claim 7, wherein the processor is to decrypt a portion of the data from which the message is derived.

9. The device of claim 1, wherein respective ones of the number of ranging pulses have a phase of either a positive-going phase or a negative-going phase, wherein the phases of the respective ones of the number of ranging pulses of the pulse group are according to a pulse-phase signature, and wherein the processor is to validate a transmitter of a ranging signal by comparing phases of the number of ranging pulses with the pulse-phase signature of the transmitter.

10. The device of claim 1, wherein the processor is to identify a transmitter of a ranging signal at least partially responsive to an inter-pulse interval, the inter-pulse interval being a duration of a time separation between the number of ranging pulses.

11. The device of claim 1, wherein the processor is to:
    obtain a time of transmission of the pulse group; and
    adjust the time of transmission to account for a dithering interval.

12. The device of claim 11, wherein the processor is to determine a location of the device at least partially responsive to the adjusted time of transmission.

13. The device of claim 1, wherein the processor is to determine a location of the device at least partially responsive to the number of ranging pulses.

14. A device comprising:
   an antenna to receive a signal encoding timing information for one or more of positioning, navigation, and timing, the signal comprising a pulse group comprising a number of ranging pulses and a number of data pulses, respective ones of the number of ranging pulses having a phase of either a positive-going phase or a negative-going phase, wherein the phases of the respective ones of the number of ranging pulses are encoded according to a pulse-phase signature, respective ones of the number of data pulses having a phase of either a positive-going phase or a negative-going phase, wherein data is encoded in data symbols correlated to sets of phases of the data pulses;
   a memory to store a table that correlates data symbols to sets of phases of data pulses;
   a processor to:
      validate a transmitter of the signal based on comparing observed phases of the respective ones of the number of ranging pulses with the pulse-phase signature of the transmitter;
      decode respective ones of the data symbols based on comparing observed phases of the respective ones of the number of data pulses to entries in the table that correlates the data symbols to the sets of phases of data pulses;
      obtain data at least partially responsive to the decoded data symbols; and
      derive a message from the data.

15. The device of claim 14, wherein the processor is to update timing information of the processor at least partially responsive to the data.

16. The device of claim 14, wherein the processor is to determine a location of the device at least partially responsive to the number of ranging pulses.

17. A method comprising:
   receiving a signal encoding timing information for one or more of positioning, navigation, and timing, the signal comprising a pulse group comprising a number of ranging pulses and a number of data pulses, respective ones of the number of data pulses having a phase of either a positive-going phase or a negative-going phase, wherein data is encoded in data symbols correlated to sets of phases of the data pulses;
   observing phases of the respective ones of the number of data pulses;
   decoding respective ones of the data symbols based on comparing the observed phases to entries in a table that correlates the data symbols to the sets of phases of the data pulses; and
   obtaining data at least partially responsive to the decoded data symbols.

18. The method of claim 17, wherein respective ones of the number of ranging pulses have a phase of either a positive-going phase or a negative-going phase, the phases of the respective ones of the number of ranging pulses of the pulse group are according to a pulse-phase signature, and the method comprises validating a transmitter of a ranging signal by comparing phases of the number of ranging pulses with the pulse-phase signature of the transmitter.

19. The method of claim 17, comprising determining a location at least partially responsive to the number of ranging pulses.

* * * * *

UNITED STATES PATENT AND TRADEMARK OFFICE
CERTIFICATE OF CORRECTION

PATENT NO. : 12,210,108 B2  
APPLICATION NO. : 17/660020  
DATED : January 28, 2025  
INVENTOR(S) : Benjamin Peterson, Jeremy Dean Warriner and Richard Stuart Foster Page 1 of 1

It is certified that error appears in the above-identified patent and that said Letters Patent is hereby corrected as shown below:

On the Title Page  
In ITEM (63) Related U.S. Application Data  
    Line 2,     change "filed on Sep. 10, 2021." to  
        --filed on Sep. 10, 2021, now U.S. Patent 12,174,284,  
        issued Dec. 24, 2024.--

In the Specification  
Column 1,   Line 12,   change "2021, which" to --2021, now U.S. Patent 12,174,284, issued Dec. 24, 2024, which--  
Column 1,   Line 15,   change "as a first-U.S. patent" to --as a U.S. patent--  
Column 1,   Lines 18-19,   change "2022, for and U.S. patent" to --2022, and U.S. patent--

Signed and Sealed this  
Thirteenth Day of May, 2025

Coke Morgan Stewart  
*Acting Director of the United States Patent and Trademark Office*